(12) United States Patent
De Meter et al.

(10) Patent No.: US 10,336,003 B2
(45) Date of Patent: Jul. 2, 2019

(54) METHOD AND DEVICES TO MINIMIZE WORK-PIECE DISTORTION DUE TO ADHERING STRESSES AND CHANGES IN INTERNAL STRESSES

(71) Applicant: Blue Photon Technology & Workholding Systems LLC, Shelby, MI (US)

(72) Inventors: Edward C. De Meter, State College, PA (US); Danial Billings, Fremont, MI (US)

(73) Assignee: Blue Photon Technology & Workholding Systems LLC, Shelby, MI (US)

( * ) Notice: Subject to any disclaimer, the term of this patent is extended or adjusted under 35 U.S.C. 154(b) by 209 days.

(21) Appl. No.: 15/327,905

(22) PCT Filed: Jul. 21, 2015

(86) PCT No.: PCT/US2015/041270
§ 371 (c)(1),
(2) Date: Jan. 20, 2017

(87) PCT Pub. No.: WO2016/014482
PCT Pub. Date: Jan. 28, 2016

(65) Prior Publication Data
US 2017/0203398 A1  Jul. 20, 2017

Related U.S. Application Data

(60) Provisional application No. 62/027,293, filed on Jul. 22, 2014.

(51) Int. Cl.
*B29C 65/48* (2006.01)
*B23Q 1/03* (2006.01)
(Continued)

(52) U.S. Cl.
CPC ............. *B29C 65/48* (2013.01); *B23Q 1/035* (2013.01); *B23Q 3/084* (2013.01); *B29L 2031/727* (2013.01)

(58) Field of Classification Search
CPC ........ B23Q 1/035; B23Q 1/037; B23Q 3/084; B23Q 3/067; B23Q 3/107; B25B 1/2421;
(Continued)

(56) References Cited

U.S. PATENT DOCUMENTS

| 2,754,708 A | 7/1956 | Peterson |
| 5,407,185 A | 4/1995 | Zehnpfennig et al. |

(Continued)

FOREIGN PATENT DOCUMENTS

| DE | 19603579 A1 * | 4/1997 | ........... B25B 1/2421 |
| DE | 202012101508 U1 | 6/2012 | |

(Continued)

*Primary Examiner* — John L Goff, II
(74) *Attorney, Agent, or Firm* — Dinsmore & Shohl LLP

(57) ABSTRACT

A method of allowing a work-piece to obtain its free state shape while bonded to an adhesive fixture includes allowing the fixing surfaces to change shape or position relative to a fixture base without degrading the holding strength of the adhesive joints. A floating adhesive fixture may use one or more floating adhesive fixture devices. Each device includes a fixture element with an integral fixing surface that can displace relative to the fixture, a clamping system that can release or prevent this motion, and a suspension that keeps the fixture element in a nominal position when the clamping system is disengaged. A method includes unclamping the fixture elements and allowing them to displace as the adhesive joints and work-piece reduce strain energy. The clamping of the fixture elements prepares the fixture for the ensuing manufacturing process.

14 Claims, 11 Drawing Sheets

(51) Int. Cl.
*B23Q 3/08* (2006.01)
*B29L 31/00* (2006.01)

(58) Field of Classification Search
CPC ......... B32B 37/12; B29C 65/48; B29C 65/66; B29C 65/78; B29C 66/005; B29C 66/343; B29C 66/3432; B29C 66/81451
USPC ...................................................... 156/247
See application file for complete search history.

(56) References Cited

U.S. PATENT DOCUMENTS

| | | | |
|---|---|---|---|
| 5,624,421 | A | 4/1997 | Dabi et al. |
| 5,984,293 | A | 11/1999 | Abrahamson et al. |
| 6,000,784 | A | 12/1999 | Takemoto et al. |
| 6,302,512 | B1 | 10/2001 | Ikegame et al. |
| 6,398,892 | B1 | 6/2002 | Noguchi et al. |
| 6,596,104 | B1 | 7/2003 | Tomiyama |
| 6,663,477 | B1 * | 12/2003 | Gee .......................... B24B 37/30 451/364 |
| 7,480,975 | B2 | 1/2009 | Verbrugge et al. |
| 7,484,464 | B2 | 2/2009 | Shen et al. |
| 7,524,390 | B2 | 4/2009 | DeMeter et al. |
| 7,918,963 | B2 | 4/2011 | Terashi et al. |
| 2005/0263950 | A1 | 12/2005 | Hamann |
| 2010/0170635 | A1 | 7/2010 | Savoie |
| 2013/0008587 | A1 * | 1/2013 | Raffles ................... B23Q 3/084 156/91 |

FOREIGN PATENT DOCUMENTS

| | | |
|---|---|---|
| GB | 2458738 A | 10/2009 |
| WO | 9713617 A1 | 4/1997 |

\* cited by examiner

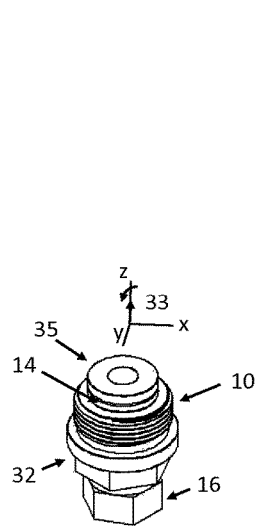
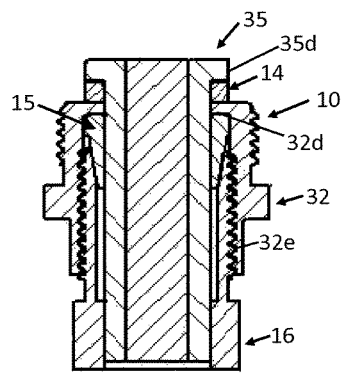
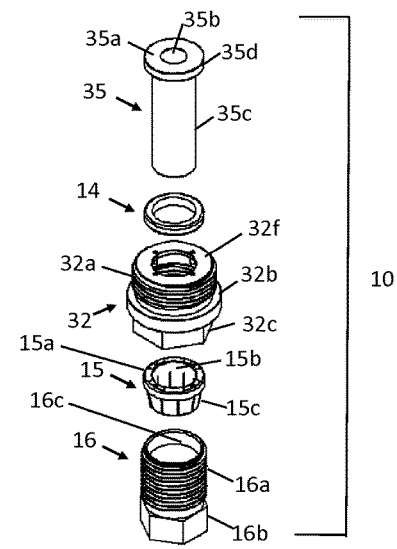
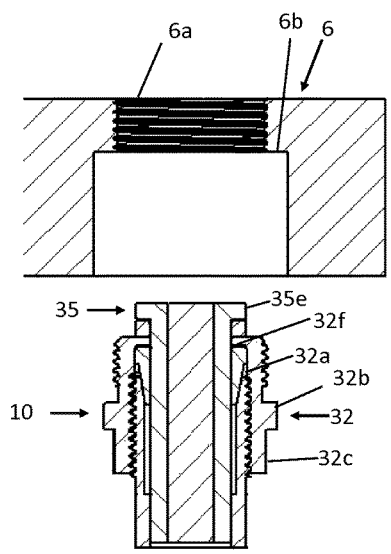
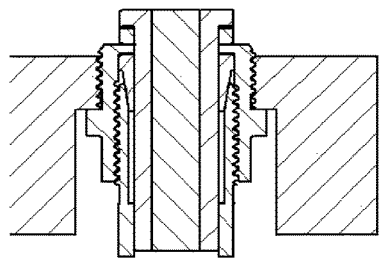
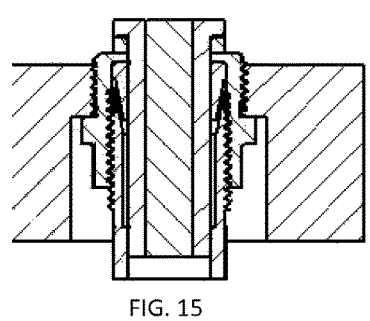
FIG. 10
FIG. 11
FIG. 12
FIG. 13
FIG. 14
FIG. 15

METHOD AND DEVICES TO MINIMIZE WORK-PIECE DISTORTION DUE TO ADHERING STRESSES AND CHANGES IN INTERNAL STRESSES

CROSS-REFERENCE TO RELATED APPLICATIONS

This application is a 371 national stage application claiming priority to international application No. PCT/US2015/041270, filed Jul. 21, 2015, which claims priority to U.S. patent application No. 62/027,293, filed Jul. 22, 2014, the contents of both of which are incorporated herein in their entirety.

BACKGROUND OF THE INVENTION

Adhesive fixtures are used extensively in manufacturing industries to hold work-pieces relative to fabrication processes, assembly processes, and inspection processes. The types of work-pieces held include solid work-pieces, locked-out assembled work-pieces, and semi-locked out assembled work-pieces. The principle advantages to using this type of fixture in comparison to mechanical clamping fixtures, magnetic chucks, vacuum chucks, and electric-static chucks are: 1) enhanced access to the work-piece, 2) selectable holding strength and stiffness via choice of the adhesive, 3) diversity in the work-piece shapes, materials, and surface topographies that can be held, 4) ease of use and robustness of holding surfaces typically subject to significant geometric variation, and 5) the ability to induce less distortion into a geometrically complex, compliant work-piece prior to processing. These attributes are especially important to all processes that require the work-piece to be the held in its free state shape with sufficient stiffness.

FIGS. 1-4 illustrate typical adhesive work-holding devices. As matter of example, a system used for a machining process is provided. Regardless, the concepts presented are generalizable to all adhesive fixturing applications in the current state of the art.

FIG. 1 illustrates a fixture-work-piece assembly immediately after the adhesion process. The entire system is positioned at a prescribed location relative to a datum reference frame 1. The work-piece 2 is in contact with a system of fixture supports 3. The supports contact the work-piece at prescribed regions, thus registering its position relative to the datum reference frame. They also provide mechanical restraint.

Adhesive grippers 4 in combination with an adhesive 7 bond the work-piece relevant surfaces. In many applications, the adhesive grippers are permanently mounted to the fixture base (6). However in other applications they may not be. For many applications, the principal means to de-bond the work-piece is to move the gripper relative to the fixture base.

In addition, prior to the initiation of the adhesion process, it is possible that the grippers are not in the positions illustrated in FIG. 1. For example each could be moved to a position that provides clearance to the work-piece and enables it to be more easily loaded into the fixture. However at some point, each gripper is moved to the positions shown and its six d.d.o.f. (displacement degrees of freedom) are fully locked out relative to the fixture base. The d.d.o.f. of each gripper remains locked out indefinitely or until the time that the work-piece is de-bonded. By definition the adhesive grippers are part of the fixture base during this interval of time.

As a system, the supports and grippers completely lock out all possible d.d.o.f. between the work-piece surfaces, the fixture base, and the datum reference frame. Furthermore because the system is locked out, and because the adhesive fixture was designed correctly, the system has sufficient stiffness and holding strength to insure the success of the machining process. In general nearly every adhesive work-holding application requires a minimum level of holding stiffness and holding strength to be imparted by the adhesive fixture.

FIG. 2 illustrates another common practice. Here adhesive supports are used to both register the work-piece as well as provide adhered-mechanical restraint. Similar to the adhesive grippers, the d.d.o.f. of each adhesive support is fully locked out relative to the base prior to the adhesion process. Likewise it remains immobile till work-piece de-bonding or indefinitely.

FIG. 3 illustrates another common practice. Specifically external forces, represented by the arrows, are often applied to the work-piece to gently push it against the supports and adhesive supports prior to the activation of a structural adhesive in order to maintain it its registration. The external forces may be supplied by human hand, spring loaded clamps, pneumatically actuated clamps, hydraulically actuated clamps, magnetic force, or air pressure via a vacuum. These external forces are removed once the adhesive has hardened.

In the case of pressure sensitive adhesives, external forces are applied to the work-piece to push it against an adhesive support or adhesive gripper. This plastically deforms the tacky adhesive across the relevant surfaces and the fixing surfaces.

All of this activity creates elastic, preloaded contact stresses between the work-piece and the supports, adhesive supports, and adhesive. By design, these stresses are negligibly small and do not cause the work-piece to distort significantly.

FIG. 4 illustrates another common practice. In this case, the supports that are used to register the work-piece are removed in order to provide increased access to the work-piece. This is done with the understanding that the adhesive supports and adhesive grippers provide sufficient restraint to the work-piece and that the system has sufficient stiffness for the machining process.

It should be noted that that the assembly and bonding of the work-piece can be done anywhere. In some applications, the fixture base is permanently mounted to the machine in which the process is to be carried out. In other applications, the fixture base serves as a carrier that is mounted and dismounted to different machines used to carry out a sequence of processes. In this case, the fixture base typically incorporates a very precise kinematic coupling system that mates with a corresponding system in each machine. All of this is possible under the assumption that the datum reference frame, fixture base, and bonded work-piece traverse as a single rigid body.

Adhesive fixtures suffer two important limitations. The first limitation is that the adhesion process can exert stresses that distort the work-piece 2 from its free state shape 8 as shown in FIG. 5. If the distorted-displaced work-piece 2 is machined while held in this bonded state, the newly created surfaces may have negligible form error as illustrated in FIG. 6. Yet if the adhesive bonds are broken as illustrated in FIG. 7, the work-piece 2 will relax and take on a new free state shape 8. This will cause the previously machined surfaces to distort, and possibly go out of tolerance.

The means by which the work-piece distorts depends on what type of adhesive is used. In the case of a pressure sensitive adhesive, work-piece shape distortion is due to the flexure of the work-piece as it is being forced on to the adhesive. During this process the adhesive is plastically deforming as both the adhesive interface and the work-piece distortion continuously grow. Once the work-piece is secured and the external forces are removed, reactive elastic stresses at the adhesive interface will not let the work-piece relax back to its free state shape.

In general, work-piece distortion due to the adhesion process is exacerbated if the work-piece relevant surfaces are very compliant. It is also exacerbated by any variation in the external pressure applied to the work-piece as well as any local variation in adhesive thickness and compliance.

When structural adhesives are used, work-piece distortion results from two phenomena occurring at the same time. The first is the dynamic change in the elastic modulus and density of the adhesive as it solidifies. While the adhesive changes volume, it is adhered to both the relevant surface and the fixing surface. Normal stresses at the interfaces pull the surfaces together during shrinkage while they are pushed apart with expansion. The second is differential thermal expansion/contraction between the relevant surface, adhesive, and fixing surface. This is especially problematic for cases in which the three have significantly different coefficients of thermal expansion and when the adhesive must undergo a significant drop in temperature to solidify.

At the end of solidification, when the system has had the opportunity to uniformly reach, for example, 20° C., elastic stresses within the adhesive joints and at the interfaces prevent the work-piece from reaching its free state shape. It should be noted that in extreme cases when the compliance of a work-piece increases dramatically due to significant material removal, it is possible for the residual stresses in the adhesive joints to appreciably and dynamically distort the work-piece even further from the free state while it is still adhered in the fixture.

Work-piece distortion due to adhesive solidification increases with increased compliance of the relevant surface and an increase in residual stresses within the adhesive joint. Residual stresses generally increase with increased distance between the relevant surface and the fixing surface. They also generally increase with regard to the following adhesive properties: unrestrained, volumetric shrinkage percentage; modulus of elasticity; and coefficient of thermal expansion. They also increase with decreased compliance of the fixing surface.

The second limitation of an adhesive fixture is the restraint that it provides to a work-piece distorted by an imbalance of internal residual stresses. FIG. 8 illustrates a work-piece 2 that was theoretically adhered to a fixture without the development of residual, adhesive stresses and consequently was in its free state shape. This work-piece was subsequently machined, yielding a machined surface with negligible geometric error. Prior to machining, the internal stresses within the work-piece were in equilibrium. Unfortunately the machining process removes a portion of these internal stresses, causing an imbalance, which also results in stresses arising in the adhesive joints. To relieve the internal strain energy arising from this imbalance, the work-piece must obtain a new free state shape. However the restraint provided by the adhesive joints prevents this. Consequently the machined surface is free from form error while adhered in the fixture.

FIG. 9 illustrates the work-piece 2 obtaining its free state shape 8 once the adhesive joints are removed. In this case, the machined surface is now distorted. This phenomenon occurs to varying degree for all material removal processes and material addition processes.

The big problem with this phenomena is that the geometry of a part must often be characterized while it is in the free state. Consequently the adhesive bonds must be broken prior to inspection. If the part is out of tolerance, it will have to be re-bonded to the fixture and re-processed.

In many cases it is very difficult to eliminate work-piece shape distortion that results from the combination of adhesion stresses and imbalanced internal stresses. It is not unusual for the work-piece to undergo many cycles in which it is bonded to the fixture, processed, de-bonded, and measured to verify specifications or to determine necessary correction in the manufacturing process. All of this leads to increased manufacturing lead time and increased manufacturing cost.

In general, this problem is more significant if adhesive joints restrain surfaces that are highly compliant at any stage of the manufacturing process. Unfortunately, compliant work-piece surfaces are the ones that are in the greatest need of support from an adhesive joint in order to counteract external stresses supplied by the manufacturing process. Yet forming adhesive joints on these surfaces can cause significantly greater distortion than the manufacturing process.

Both problems just described could be eliminated entirely if the elastic stresses within the adhesive joints could be minimized on-demand, whenever the work-piece is free from external loading. Theoretically this could happen if the adhesive can strain via creep. The creep modulus of many adhesives increases with increased temperature.

While not related to adhesive work-holding, this is a common technique employed in welding processes. To relieve highly stressed welded joints, the entire welded assembly is placed into an oven and allowed to thermally soak at elevated temperatures. This releases stresses within the joints and allows the structure to obtain a new equilibrium shape.

While this process is suitable for welding, it is not particularly attractive for accurate work-holding. Not only is it time consuming and cumbersome, but there is no guarantee it will lead to the desired result. At the elevated temperature, it may be possible to achieve stress free joints, but during cool down, heat transfer and differing thermal contraction may cause residual stresses to re-appear.

There are other approaches advocated in the prior art. All of them address the reduction of work-piece distortion due to the adhesion process. With regard to the use of pressure sensitive adhesives for work-holding of thin, flat, ultra-compliant silicon wafers, U.S. Pat. No. 6,398,892 advocates the use of an extremely flat and rigid adhesive support to minimize localized stiffness and thickness variation.

U.S. Pat. No. 5,624,521 explains that one of the best ways to reduce shrinkage distortion during lens blocking is to minimize the relevant surface area in contact with adhesive. Furthermore it is far better to use a distribution of a large number of small, disconnected adhesive patches rather than one large contiguous patch.

Another approach is to select an adhesive chemistry that provides the desired mechanical properties, but induces minimal shrinkage stresses. For example, a common approach for polymer adhesives is to choose one with either a very low elastic modulus or one with a very low volumetric shrinkage percentage. A popular way to accomplish the latter is to add inert filler (glass, ceramics, pre-polymerized adhesive, etc.) into the uncured adhesive to thus reduce the total volume of adhesive that needs to be polymerized. This approach is advocated by US Patent No. US Pub US2010/0170635 for lens blocking. It is also highly desired to choose a polymer adhesive with a glass transition temperature well above the highest temperature expected in the manufacturing process in order to minimize thermal growth of the adhesive.

With regard to the use of thermo-plastics and low temperature melt alloys, it is typically desirable to choose one with some combination of low volumetric shrinkage percentage, low coefficient of thermal expansion, and low solidus temperature. The latter is typically chosen to not to be too far above the maximum operating temperature of the manufacturing process.

Other approaches can be adapted from the general area of adhesive assembly. Some important considerations are:

1. The displacement of an adhered component can be minimized if the external stresses acting on its relevant surfaces cancel each other. In this case, the work-piece will distort, but not displace. This can be controlled through joint design and the control of thickness variation in the adhesive joints. (see U.S. Pat. Nos. 6,000,784, 6,596,104)
2. The use of thinner adhesive joints and less adhesive can minimize assembly distortion and misalignment. (see U.S. Pat. No. 6,000,784)
3. Curing adhesive patches in sequence rather than simultaneously can significantly reduce both work-piece distortion and work-piece displacement. If adhesive joints are cured in sequence, solidified joints can stiffen relevant surfaces yet to be bonded. (see U.S. Pat. No. 6,000,784).
4. Adhesively bonding intermediary components into an assembly can reduce the alignment error of critical components. Basically the addition of intermediary components gives more design freedom for joint design and curing sequence. (see U.S. Pat. No. 6,000,784)
5. When bonding a relevant surface, distortion and displacement can be reduced if a low volume shrinkage percentage adhesive is used in combination with a principal adhesive that induces higher shrinkage stress. By first solidifying the low shrink adhesive, it is possible to stiffen the relevant surface. This significantly reduces distortion when the principal adhesive is solidified. (see U.S. Pat. No. 6,302,512)
6. If adhesive joints are solidified simultaneously, work-piece distortion and displacement can be minimized by controlling the solidification rate and heat transfer at different joints or at different regions within an adhesive joint. (see U.S. Pat. No. 7,918,963 B2)

All of the techniques listed here can be applied with varying degrees of success to minimize work-piece distortion and work-piece displacement during the adhesion process. But none of these techniques address the second problem.

One way to minimize the second problem is to reduce residual internal stresses within the work-piece prior to bonding. With this in mind, it is not uncommon for metallic work-pieces to be stress relieved by thermal heat treatment prior to material removal processes, regardless of holding method. In these cases, the work-pieces are allowed to cool to room temperature before mounting. This is an effective technique, but it has a number of limitations. It cannot be universally applied to all work-piece materials. It sometimes leads to unwanted shape distortion of pre-existing features. It is an added step that costs time and money. Furthermore it cannot typically be applied while the part is held adhesively. Most value added materials have stress relief temperatures which will destroy many practical work-holding adhesives. They can also damage the adhesive fixture.

SUMMARY OF THE INVENTION

An embodiment of the present invention discloses a method that may allow the work-piece to obtain its free state shape while bonded to the adhesive fixture. One embodiment requires the adhesive fixture to utilize a base and a plurality of fixing surfaces capable of changing shape and/or displacing relative to the base. The method comprises the steps of adjoining adhesive to a fixing surface; adhering the adhesive to a fixing surface and work-piece to create an adhesive bond between the two for the purpose of restraining the work-piece during a manufacturing process; and altering a fixing surface with a shape change and/or displacement to allow the work-piece to obtain an equilibrium shape closer to the free state, and not rupture the adhesive joint nor reduce its holding strength.

According to one embodiment, a method of holding a work-piece on an adhesive fixture includes providing a fixture having a fixture base and a plurality of fixing surfaces each capable of at least one of changing shape and displacing relative to the fixture base. Adhesive is adjoined to at least one of the plurality of fixing surfaces. The adhesive is adhered to the fixing surface and to a work-piece to create an adhesive joint between the fixing surface and work-piece to restrain the work-piece during a manufacturing process. The at least one fixing surface is altered with a shape change or displacement such that the work-piece is allowed to obtain an equilibrium shape closer to a free state without rupturing the adhesive joint or substantially reducing its holding strength.

In some versions, the fixture includes a plurality of fixture elements each defining one of the fixing surfaces, and each of the fixture elements is capable of displacing relative to the fixture base with prescribed degrees of freedom. The fixture further includes a clamping system operable to selectively disengage so as to release displacement of each of the fixture elements relative to the base or engage so as to stop displacement of each of the fixture elements relative to the base. In this version, the adjoining and adhering steps include adjoining adhesive to the fixing surfaces of the fixture elements and adhering the fixing surfaces of the fixture elements to the work-piece. The clamping system is disengaged such that the fixture elements are displaceable. Each of the fixture elements is allowed to displace as the work-piece and adhesive joint obtain the equilibrium shape to reduce strain energy, and the clamping system is engaged to stop the motion freedom of the fixture elements after the work-piece has obtained its equilibrium shape.

In certain embodiments, the fixture further includes a suspension for each fixture element, each suspension supporting the respective fixture element such that the fixture element is supported in a nominal pose relative to the fixture base, such that when the clamping system is disengaged, gravitational forces acting on the fixture elements are countered by the suspensions. Examples of suspensions include: a solid part that intercedes in a connection between the fixture element and base, said solid part made from at least one of a polymer and material with a porous internal structure; a mechanical flexure that intercedes in the connection between the fixture element and base; a fluid filled bladder that intercedes in a connection between the fixture element and base, said fluid selected from a group consisting of a gas or liquid; a magnetic levitation system having an electro-magnetic system attached to the base and magnets or ferro-magnetic material integral with the fixture element such that the fixture element is supported by magnetic forces that result from an electrical current running through the electro-magnetic system; and an aero-levitation system wherein the fixture element has airfoil features and the fixture element is supported by pressure exerted on the airfoils by a fluid flowing past the fixture element, said fluid transported through the base.

In certain embodiments, the fixture base defines a planar surface and the fixture element is held in close proximity to the planar surface of the base by the suspension. The fixture element is configured to displace by a translation parallel to the planar surface of the base, a rotation about an axis parallel to the normal of the planar surface of the base, and/or a rotation about a line parallel to the planar surface of the base.

In certain embodiments, the fixture base defines a geometric feature with a central axis and the fixture element is held in close proximity to the geometric feature by the suspension. The fixture element is configured to displace by a translation parallel to the central axis, a rotation about a line parallel to the central axis, and/or a rotation about a line perpendicular to the central axis.

In some versions, the fixing surfaces do not make direct contact with the work-piece.

In certain embodiments, the clamping system includes a thin walled sleeve that either surrounds the fixture element or is surrounded by the fixture element, and the step of engaging the clamping system includes deforming the thin walled sleeve laterally into frictional contact with the fixture element to stop displacement of the fixture element. The deforming of the thin wall sleeve may be actuated by: fluid pressure; electro-magnetic force; axial compression applied to the thin walled sleeve; axial tension applied to the thin walled sleeve; or axial torsion applied to the thin walled sleeve.

In certain other embodiments, the clamping system includes a reverse collet with a split, tapered tangs that surround the fixture element and a clamp with a tapered surface that mates with the collet tangs, and the step of engaging the clamping system to stop displacement of the fixture element includes displacing the clamp relative to the collet, forcing the tangs to deform and creating frictional contact with the fixture element; and the step of disengaging the clamping system and releasing displacement of the fixture element includes displacing the clamp is in an opposite direction.

In some versions, the clamping mechanism includes a clamping piston, the step of engaging the clamping system includes displacing the piston orthogonal to the planar surface into frictional contact with the fixture element and the step of disengaging the clamping system includes displacing the piston in an opposite direction.

In some versions, the clamping mechanism includes a clamping piston, the step of engaging the clamping system includes displacing the piston orthogonal to the central axis into frictional contact with the fixture element and the step of disengaging the clamping system includes displacing the piston in an opposite direction.

In certain embodiments, the adhesive is a structural adhesive and the step of adhering of the adhesive includes positioning each fixture element and its suspension relative to the fixture base in order to obtain an optimal pose between the respective fixing surface and work-piece, disengaging the clamping system, adjoining the adhesive, in a viscous state, to the fixing surface and work-piece, allowing the adhered fixture element to displace with its respective displacement freedom as the adhesive transitions from the viscous state to a solid state, and engaging the clamping system to stop the displacement freedom of the fixture element.

In certain embodiments, the fixture includes a continuous flexible element defining a continuous flexible fixing surface, the continuous flexible element being adjoined to the fixing surfaces of a plurality of the fixture elements. The step of disengaging the clamping system allows the continuous fixing surface to change shape and position for the purpose of reducing the stresses within the adhesive joints and allowing the work-piece to obtain a new equilibrium shape.

In certain embodiments, the fixture further includes actuators operable to actively change the shape of the fixing surfaces and/or displace the fixing surfaces, a network of sensors operable to measure strain, stress, force, and/or temperature from at least one of the adhesive joints and fixing surfaces, and a controller in communication with the actuators and sensors, wherein the altering of the fixing surfaces is controlled by the controller communicating with the actuators and sensors to minimize the stresses in the adhesive joints.

In certain embodiments, the adhesive is a radiation curable adhesive and the step of adhering the adhesive to the fixing surface and work-piece involves the transmission of curing radiation into the adhesive.

In certain embodiments, the fixing surface includes a core transparent to curing radiation and the step of adhering the adhesive further includes transmission of a curing radiation through the core and into the adhesive.

Another embodiment of the invention provides a fixture for holding a work-piece during a manufacturing process. The fixture includes a base and a plurality of fixing surfaces configured to receive adhesive for bonding a work-piece to the fixing surfaces. The fixing surface are configured for a displacement and/or shape change to reduce stresses within an adhesive joint and allow the work-piece to obtain an equilibrium shape closer to a free state without rupturing the adhesive joint or substantially reducing its holding strength.

In certain embodiments, the fixture also includes a plurality of fixture elements each defining one of the fixing surfaces, each of the fixture elements being capable of displacing relative to the fixture base with prescribed degrees of freedom. A clamping system is operable to selectively disengage so as to release displacement of each of the fixture elements relative to the base or engage so as to stop displacement of each of the fixture elements relative to the base. A suspension is operable to support each fixture element in a nominal pose, wherein when the clamping system is disengaged, gravitational forces acting on the fixture element are countered by the suspension.

Examples of a suspension include: a solid part that intercedes in a connection between the fixture element and base, said solid part made from at least one of a polymer and material with a porous internal structure; a mechanical flexure that intercedes in the connection between the fixture element and base; a fluid filled bladder that intercedes in a connection between the fixture element and base, said fluid selected from a group consisting of a gas or liquid; a magnetic levitation system having an electro-magnetic system attached to the base and magnets or ferro-magnetic material integral with the fixture element such that the fixture element is supported by magnetic forces that result from an electrical current running through the electro-magnetic system; and an aero-levitation system wherein the fixture element has airfoil features and the fixture element is supported by pressure exerted on the airfoils by a fluid flowing past the fixture element, said fluid transported through the base.

In some versions, the fixture base defines a planar surface, the fixture element is held in close proximity to the planar surface of the base by the suspension, and the fixture element is configured to displace by a translation parallel to the planar surface of the base, a rotation about an axis parallel to the normal of the planar surface of the base, and/or a rotation about a line parallel to the planar surface of the base.

In some versions, the fixture base defines a geometric feature with a central axis, the fixture element is held in close proximity to the geometric feature by the suspension, and the fixture element is configured to displace by a translation parallel to the central axis, a rotation about a line parallel to the central axis, and/or a rotation about a line perpendicular to the central axis.

In some embodiments, the fixing surfaces do not make direct contact with the work-piece.

In certain embodiments, the clamping system includes a thin walled sleeve that either surrounds the fixture element or is surrounded by the fixture element, and the thin walled sleeve deforms laterally into frictional contact with the fixture element to stop displacement of the fixture element. The deforming of the thin wall sleeve may be actuated: fluid pressure; electro-magnetic force; axial compression applied to the thin walled sleeve; axial tension applied to the thin walled sleeve; or axial torsion applied to the thin walled sleeve.

In other embodiments, the clamping system includes a reverse collet with a split, tapered tangs that surround the fixture element and a clamp with a tapered surface that mates with the collet tangs. The clamping system engages to stop displacement of the fixture element when the clamp is displaced relative to the collet, forcing the tangs to deform and create frictional contact with the fixture element. The clamping system disengages and releases displacement of the fixture element when the clamp is displaced in an opposite direction.

In some versions, the clamping system includes a clamping piston that displaces orthogonal to the planar surface into frictional contact with the fixture element, and the clamping system disengages and releases the fixture element when the piston is displaced in an opposite direction. In other versions, the clamping system includes a clamping piston that displaces in a direction orthogonal to the central axis into frictional contact with the fixture element, and the clamping system disengages and releases the fixture element when the piston is displaced in an opposite direction.

In certain embodiments, the fixture includes a continuous flexible element defining a continuous flexible fixing surface, and the continuous flexible element is adjoined to the fixing surfaces of a plurality of the fixture elements, such that the disengagement of the clamping system allows the continuous fixing surface to change shape and position for the purpose of reducing the stresses within the adhesive joints and allowing the work-piece to obtain a new equilibrium shape.

In some embodiments, the fixture includes actuators operable to actively change the shape of a fixing surfaces and/or displace the fixing surfaces, a network of sensors to measure strain, stress, force, and/or temperature from at least one of the adhesive joints and fixing surfaces, and a controller in communication with the actuators and sensors, operable to alter the fixing surfaces to minimize the stresses in the adhesive joints.

In certain embodiments, the fixing surface includes a core that is transparent to curing radiation for solidifying the adhesive between the fixing surface and work-piece.

BRIEF DESCRIPTION OF THE FIGURES

FIG. 10 shows a floating adhesive fixture device that allows the fixture element to translate and rotate with respect to the z axis, while floating on a suspension, and which prevents these d.d.o.f with a reverse collet and clamp;

FIG. 11 shows a cross sectional view of the floating adhesive fixture device in FIG. 10;

FIG. 12 shows an exploded perspective view of the components of the floating adhesive fixture device illustrated in FIG. 10;

FIG. 13 shows a cross sectional view of a floating adhesive fixture device in close proximity to the receiving hole geometry of a fixture base;

FIG. 14 shows a cross sectional view of a floating adhesive fixture device mounted within the receiving hole geometry of a fixture base;

FIG. 15 shows a cross sectional view of the clamp disengaged from the reverse collet of the floating adhesive fixture device, thus allowing the fixture element to displace while supported by the suspension;

DETAILED DESCRIPTION OF THE INVENTION

Figure 1:
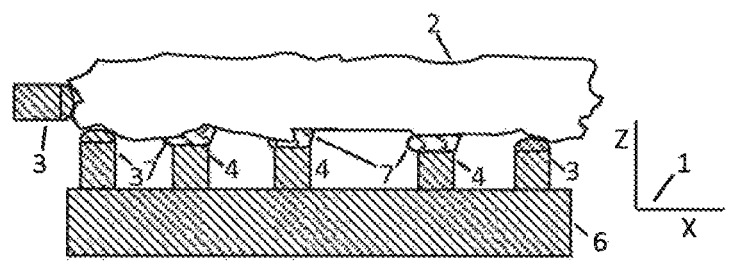
FIG. 1 shows a work-piece held in an adhesive fixture in which the fixing surfaces are integral to adhesive grippers.
Figure 2:
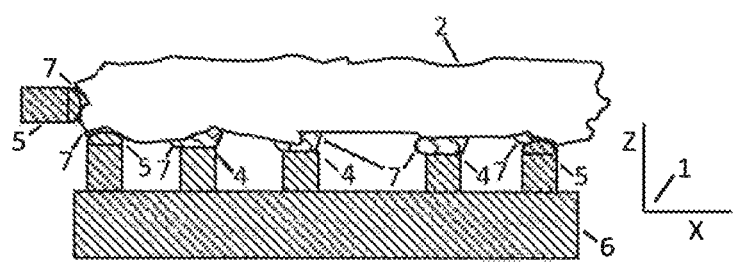
FIG. 2 shows a work-piece held in an adhesive fixture in which the fixing surfaces are integral to adhesive supports and adhesive grippers.
Figure 3:
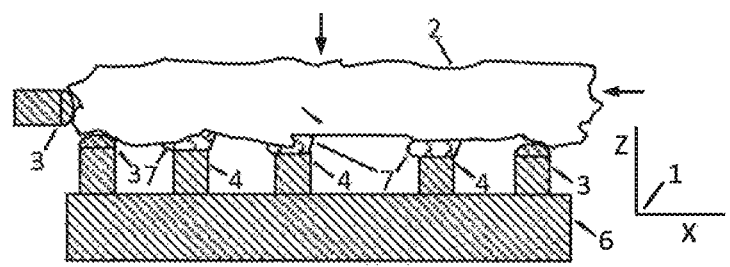
FIG. 3 shows the application of external loads to the system described in FIG. 1 to facilitate the adhesion process.
Figure 4:
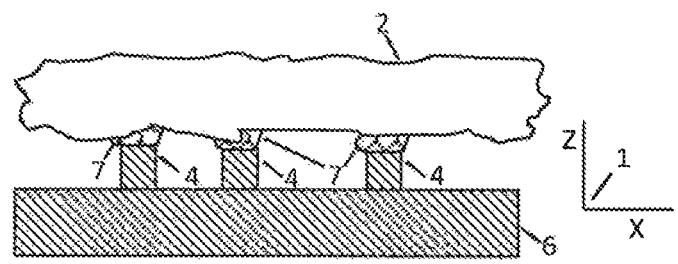
FIG. 4 shows the removal of supports from the system described in FIG. 1 after the adhesion process in order to provide greater access to the work-piece.

One component of this invention is the concept of a floating adhesive fixture device. Most embodiments of a floating adhesive fixture device include the following components:

1. An outer body that is affixed to a fixture base;

2. A solid, distinct fixture element with a fixing surface to adhere the work-piece and that can be displace relative to the outer body within a continuous, finite range and at any position within this range can have its displacement freedom stopped;

3. A clamping mechanism that can make contact with the fixture element while it is at any position within its prescribed range and in repeated fashion:

a) engage to prevent displacement of the fixing surface without significantly changing the fixing surface's position; and b) disengage to allow the displacement freedom of the fixing surface;

4. A system of guides that allow the displacement of the fixture element to occur with selected d.d.o.f. along an extended range; and 5. A system of suspensions that:

a) attaches the fixture element to the outer body and retains its nominal pose relative to the fixture base when the clamps are disengaged;

b) supports the weight of the fixture element such that it is not at an extreme limit of position with regard to each selected d.d.o.f., regardless of the orientation of the mechanism with respect to a gravitational field and without the aid of contact between the element, guides, and clamping mechanism;

c) allows the fixture element to displace within its continuous, finite range with a level of compliance that is significantly higher than the localized compliance of the work-piece surface; and d) allows the fixture element to displace with selected d.d.o.f. from an equilibrium position to another position to allow an adhered work-piece and adhesive joints to stress relieve regardless of mechanism orientation.

To be clear, the fixture element can be a single part or a locked out assembly. Each suspension can be comprised of a single part or an assembly. Likewise the outer body can also be a permanent part of the fixture base or simply a geometric feature of the fixture base. The mechanism as described can be used directly to create either a floating adhesive gripper or a floating adhesive support. Likewise a fixture that is comprised of these devices is referred to as a floating adhesive fixture.

With regard to use, when the clamping mechanism is disengaged, the suspension allows the fixing surface, in a state of very high compliance, to displace to a new equilibrium position when acted upon by gravity and contact with the work-piece and adhesive. When the clamping mechanism is engaged, the position of the fixing surface is retained, its displacement freedom is eliminated, and its compliance is now very low. Furthermore this sequence of unclamping the fixture element, letting it retain its new equilibrium shape and position, and subsequent clamping can be carried out repeatedly without the adhesive adversely affecting the performance of the mechanism and in turn movement in the mechanism not adversely affecting the adhesive.

FIGS. 10-31 provide various embodiments of the invention that function as floating adhesive fixture devices. As shown, the envelope dimensions of these devices are approximately the same. FIGS. 10-12 illustrate a self-contained floating adhesive device 10. The device consists of an outer body 32, a fixture element 35, a flexure pad 14, a reverse collet 15, and a clamp 16. The device mounts to a fixture base 6 as shown in FIGS. 13 and 14. The outer body has external threads 32a and a shoulder 32b that mate with the corresponding threads 6a and shoulder 6b of the fixture base 6. A socket wrench mates with the external hex geometry 32c and enables the use of a socket wrench to assist the manually actuated screwing motion. When the seat 32b is fully engaged with the fixture base 6, the outer body 32 becomes rigidly attached thereto, and hence becomes part of the base.

The fixture element 35 is a locked out assembly. It has a fixing surface 35a. Adhesive is applied to the entirety of the fixing surface 35a, to restrain a work-piece surface.

In an embodiment of this invention, the adhesive is a radiation curable adhesive such as a UV light curable adhesive. Consequently, embedded in the center of the fixture element 35 is an optically transparent, ceramic crystal 35b. To solidify the adhesive, light is transmitted through the crystal 35b into the adhesive joint. Light exiting the crystal diffuses throughout the adhesive covering the fixing surface 35a, causing it to solidify and adhere to the fixing surface and work-piece surface.

A reference frame 33 is provided to illustrate the displacement freedom the fixture element 35 is provided with respect to the outer body 32. In this specific example, the fixture element 35 can translate and rotate with respect to the z axis.

The flexure pad 14 is adhered to the head 35d of the fixture element 35 and to the top 32f of the outer body 32. The flexure pad 14 serves as the suspension. It is made from a spongy material with very low elastic modulus. An elastomeric material such as open cell foam may serve this purpose. One non-limiting example is polyurethane foam, which has a modulus of 12 to 20 MPa. This suspension can support the weight of the fixture element 35 but provides very little spring resistance to its six d.d.o.f. The flexure pad 14 also has the four suspension attributes that were specified previously.

The top surface 15a of the reverse collet 15 is fixed to the top surface 32d of the inner cavity of the outer body 32. The displacement freedom of the fixture element 35 is controlled by a guide. This guide is defined by the mating relationship between the external cylindrical surface 35c of the fixture element 35 and the internal cylindrical surface 15b of the reverse collet. The very small clearance between the two constrains their relative displacement to be translation and rotation about the axis of the reverse collet bore (i.e. the z-axis). The tight clearance also limits the amount the position of the fixture element can be perturbed during lock-out.

The tangs 15c of the reverse collet 15 and the clamp 16 cooperate to define the mechanism used to lock-out the displacement freedom of the fixture element 35. The collet tangs 15c are split with an external tapered surface that mates with a corresponding tapered surface 16c on the clamp 16. Threads 16a on the clamp engage internal threads 32e in the outer body 32. The clamp 16 also has external hex geometry 16b to mate with a wrench socket. This geometry is smaller than the hex geometry 32c of the outer body 32.

To lock out the displacement freedom of the fixture element 35, a socket wrench is used to manually screw the clamp 16 toward the top of the outer body 32. As it does, the tapers mate, forcing the inner surfaces of the tangs 15c to radially close on to the cylindrical surface 35c of the fixture element 35. Eventually they make contact with the fixture element and pre-loaded, frictional contact is created between all four portions of the fixture device 10.

It should be noted that the radial motion of the tangs 15c provides negligible disturbance to the Z axis position or Z axis rotation of the fixture element 35 during clamping. This is due in part to the tight cylindrical clearance between surfaces 35c and 15b. The clamp 16 is counter rotated to break contact with the collet 15 and enable the high compliance, motion freedom of the gripper. This is illustrated in FIG. 15.

As matter of example, the outer body illustrated in FIG. 10 may be made of steel. Its shape is contained within a cylindrical envelope 1 inch in diameter and 0.78 inches in length. The external threads are unified ⅞-20 2A. The internal threads are unified ⅝-20 2B. The illustrated fixture element may also be made of steel with a head diameter of 0.63 inches, a shank diameter of 0.46 inches, and an overall length of 1.35 in . . . . The ceramic crystal may be made of sapphire and is 0.25 inches in diameter.

The reverse collet may be made from steel. It fits within a cylindrical envelope 0.64 inches in diameter and 0.33 inches in length. The typical clearance between its inner bore and the shank of the fixture element will range between 0.00005 inches to 0.0005 inches. The clamp may be made of steel and has ⅝-20 2A external threads to mate with the outer body. It has an engagement surface with a 9.75 degree taper. The flexure pad may be made from polyurethane foam and is 0.2 inches thick. However this may typically range between 0.1 inches to 0.4 inches, depending on the required compliance.

Figure 16:
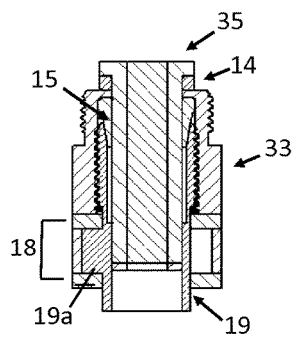
FIG. 16 shows a cross sectional view of an alternative to the device illustrated in FIG. 10, in which the clamp is actuated by a hydraulic rotary vane motor that is integral to the outer body.
Figure 17:
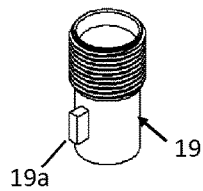
FIG. 17 shows a perspective view of the clamp illustrated in FIG. 16.

FIGS. 16 and 17 show a means of hydraulically actuating the clamp motion. The clamp 19 is actuated by a rotary vane hydraulic motor 18 that is fixed to the outer body 33. The geometry of the clamp 9 is altered to include a vane feature 19a. Forcing hydraulic fluid to either side of the vane feature will cause the clamp to advance or retract, thus enabling the locking and un-locking mechanism.

Figure 18:
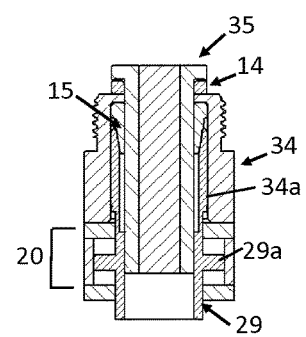
FIG. 18 shows a cross sectional view of an alternative to the device illustrated in FIG. 10 in which the clamp is actuated by a hydraulic piston actuator that is integral to the outer body.
Figure 19:
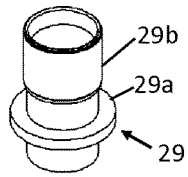
FIG. 19 shows a perspective view of the clamp illustrated in FIG. 18.

FIGS. 18 and 19 show an alternative clamp and form of hydraulic actuation. In this case, the clamp 29 has no external threads but rather a smooth cylindrical surface 29b that mates with the smooth, cylindrical bore 34a within the outer body 34. This geometry allows the clamp to linearly translate inside the outer body 34. The clamp has a piston feature 29a that fits within a hydraulic cylinder 20 that is integral with the outer body 34. Forcing hydraulic fluid to one side of the piston feature will cause the clamp to advance into contact with the reverse collet, thus locking the fixture element. Forcing the hydraulic fluid to the other side of the piston feature will cause the clamp to retract and disengage the collet.

Figure 20:
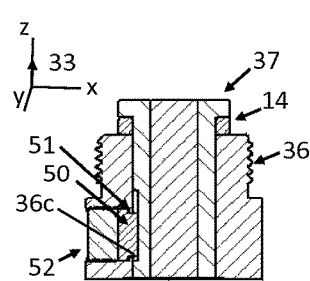
FIG. 20 shows a cross sectional view of a floating adhesive fixture device enables the fixture element to translate in the z direction and a clamping mechanism that integrates a laterally displacing piston, screw, and a flexure.
Figure 21:
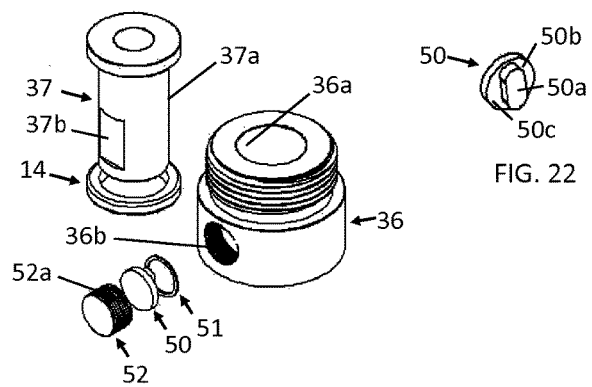
FIG. 21 shows an exploded perspective view of the components illustrated in FIG. 20.
Figure 22:
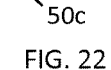
FIG. 22 shows an alternative perspective view of the piston illustrated in FIG. 20.

FIGS. 20-22 show a one degree of freedom floating adhesive fixture device. The fixture element 37 has a cylindrical surface 37a that mates with the cylindrical bore 36a of the outer body 36. The fixture element 37 also has a flat surface 37b, defined in the cylindrical surface 37a that mates with a flat surface 50a of a piston 50 that is retained within the outer body 36. These two mating relationships limit the motion of the fixture element 37 to translation in the z direction.

The clamping mechanism comprises a piston 50, a set screw 52, and an elastomeric flexure ring 51. The piston has boss feature 50b comprised of two flat surfaces connected by two radii. This boss 50b mates with a corresponding bore geometry 36c that in turn intersects surface 36a. This mating geometry prevents the piston 50 from rotating. The flexure ring 51 intercedes between surface 50b of the piston and a planar seat 36c in the outer body that surrounds the piston bore. The flexure ring 51 keeps the piston 50 disengaged from the fixture element 37 when its motion is unlocked. The set screw 52 has external threads 52a that mate with internal threads 36b in the outer body. To lock out the displacement freedom of the fixture element, the set screw 52 is advanced toward the fixture element 37. This pushes the piston 50 into pre-loaded, frictional contact with surface 37b. To unlock the fixture element 37, the set screw 52 is counter-rotated, which causes the flexure ring 51 to push the piston 50 away from surface 37b.

Figure 23:
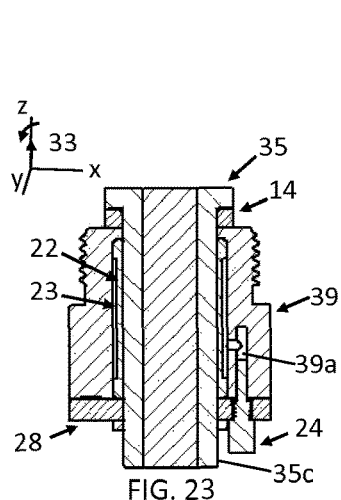
FIG. 23 shows a cross sectional view of a floating adhesive fixture device that enables the fixture element to translate and rotate with respect to the z axis, and that prevents this motion with a clamping mechanism that integrates a thin walled sleeve that surrounds the fixture element and is actuated with fluid pressure.
Figure 24:
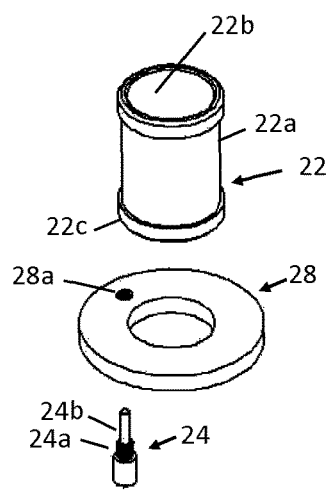
FIG. 24 shows an exploded perspective view of the guide and clamping components illustrated in FIG. 23.

FIGS. 23 and 24 show another alternative that allows the fixture element 35 to translate and rotate in the z direction. The device uses the same fixture element 35 and flexure pad 14 as the design shown in FIGS. 10-15. However rather than a reverse collet and, this device uses a thin walled sleeve 22 to guide and clamp the fixture element 35. In the embodiment shown, an end plate 28 is used to retain the sleeve 22 within the cylindrical cavity of the outer body 39. The cylindrical surface 35c of the fixture element 35 mates with the cylindrical bore 22b of the sleeve 22. This allows the fixture element to translate and rotate relative to the axis of the bore 22b. The flanges 22c of the sleeve 22 define a chamber 23 that surrounds the sleeve. The chamber 23 is connected to a reservoir 39a in the outer body 39 which is filled with hydraulic fluid. A screw 24 with a plunger tip 24b is used to actuate the sleeve and control the hydraulic pressure.

The screw has threads 24a that mate with threads 28a in the end plate 28. To lock the fixture element 35, the screw 24 is advanced. This compresses the hydraulic fluid which in turn compresses the sleeve 22a radially inward into frictional contact with the fixture element 35. Counter rotating the screw 24 depressurizes the hydraulic fluid, relaxes the sleeve 22a, and allows the fixture element 35 to move with minimal resistance relative to the z axis. This concept could also work with gas rather than fluid. Furthermore fluid pressure could be supplied and controlled by an external source rather than a screw plunger. These external sources could be an electric hydraulic power unit or an air pump. Fluid could be supplied by lines running through the fixture base and in communication with the outer body.

In the example provided, the thickness of the thin walled sleeve is 0.02 inches. In general this may typically range between 0.01 inches to 0.04 inches. The desired thickness will be a function of the hydraulic pressure and the desired holding force of the clamp.

There are also four other ways to compress the thin walled sleeve, such as 22a, into contact with the fixture element, such as 35. One way is to do so is electro-magnetically. For example, the thin walled sleeve could be split, with thin magnets attached to its outer wall. The outer most periphery of the chamber could be lined with electro-magnets. By passing electrical current through the electro-magnets, a magnetic field could be created that would force the magnets toward the fixture element. This would force the thin wall into frictional contact with the fixture element. The cessation of electrical current would allow the thin wall to relax outward, breaking contact.

Figure 25:
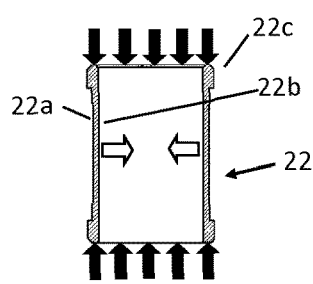
FIG. 25 shows a cross sectional view of a thin walled sleeve deforming radially inward due to longitudinal compressive forces.

Another way is to compress the thin walled sleeve 22a in the axial direction as shown in FIG. 25. If the geometry of the thin wall is designed properly, compression in the axial direction will result in the movement of the wall toward the fixture element as shown by the arrows. An embodiment of this is external surface 22a, which is concave. Alternatively the geometry of the thin wall sleeve could be designed such that tension in the axial direction will cause it to deform into frictional contact. It is also possible to design the sleeve such that a torsion, about its axis, causes it to deform into frictional contact with the fixture element.

It should also be noted that the thin walled sleeve does not necessarily have to surround the fixture element. It is just as feasible to have a fixture element surround the thin walled sleeve. The sleeve could expand outwards to make frictional contact with the fixture element.

Figure 26:
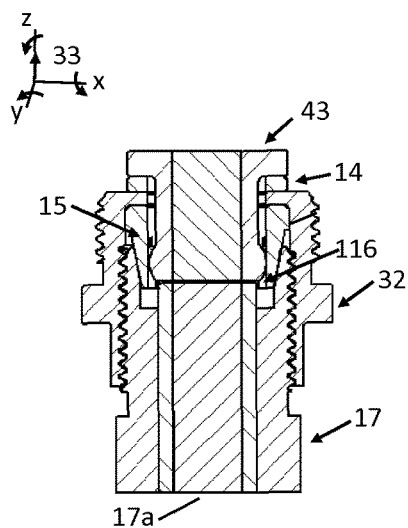
FIG. 26 shows a cross sectional view of a floating adhesive fixture device that enables the fixture element to translate with respect to the z axis and rotate about a point on the axis with three degrees of freedom, and a clamping system that integrates a reverse collet, a clamp, and a sliding race.
Figure 27:
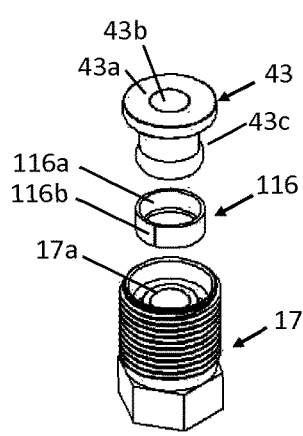
FIG. 27 shows an exploded perspective view of the fixture element, sliding race, and clamp illustrated in FIG. 26.

FIGS. 26 and 27 show a four d.o.f. device that utilizes a guide and clamping system similar to the device illustrated in FIGS. 10-15. In this case, the device allows the fixture element 43 to translate in the z direction and rotate about axes parallel to the x, y, and z axes. The fixture element 43 has a fixing surface 43a and crystal 43b similar to the ones illustrated in FIG. 11. However its length is shortened considerably and the fixture element is provided with a spherical shaped surface 43c on its tail end. This feature mates with a spherical shaped track 116a of a thin walled, sliding, split race 116. The race has an external cylindrical surface 116b that mates with surface 15b of the collet 15. The race 116 is retained inside of the collet 15 by form closure. Likewise the fixture element 43 and race 116 are supported by the flexure pad 14 when the clamp 17 is not in contact with the collet tangs.

In the example provided, the length of the fixture element is 0.52 inches and the spherical radius is 0.11 inches. The outside diameter of the race is 0.46 inches and the length is 0.17 inches. The inner track has a spherical radius of 0.111 inches.

In this configuration, the race 116 and fixture element 43 can translate in the z direction and rotate about the z axis. The fixture element 43 can also rotate about axes parallel to the x and y axes by rotating about the center point of its spherical joint. This is guided by the sliding mating contact between surfaces 43c and 116a.

A clamp 17 is used to engage the reverse collet 15 to lock and un-lock this motion. The method of engagement is similar to that described previously. One difference is that the collet tangs lock on to surface 116b. This causes the split race 116 to deform and grab hold of surface 43c. In order to transport light from the bottom of the device to the entry surface of the crystal 43b, a separate crystal 17a is embedded in the in the core of the clamp 17.

Figure 28:
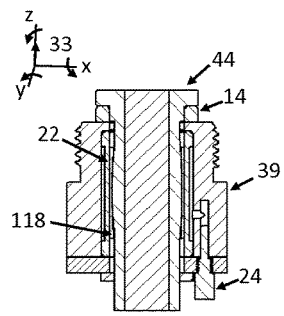
FIG. 28 shows a cross sectional view of an alternative to the device in FIG. 26, in which the clamping mechanism integrates a thin walled sleeve that surrounds the sliding insert and is actuated with fluid pressure.
Figure 29:
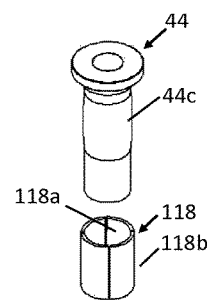
FIG. 29 shows an exploded perspective view of the fixture element and sliding race illustrated in FIG. 28.

FIGS. 28 and 29 illustrate an alternative version of this design that utilizes a hydraulically actuated, thin walled sleeve 22 to clamp the fixture element 44. In this case, the spherical guide surface 44c of the fixture element 44 is extended along its length. The sliding race 118 that it mates with it is similarly elongated. This is done to increase the grip of the clamping mechanism. In the example provided, the length of the fixture element is 1.36 inches and the spherical radius is 3.0 inches. The outside diameter of the race is 0.46 inches and the length is 0.56 inches. The inner track has a spherical radius of 3.01 inches.

Figure 30:
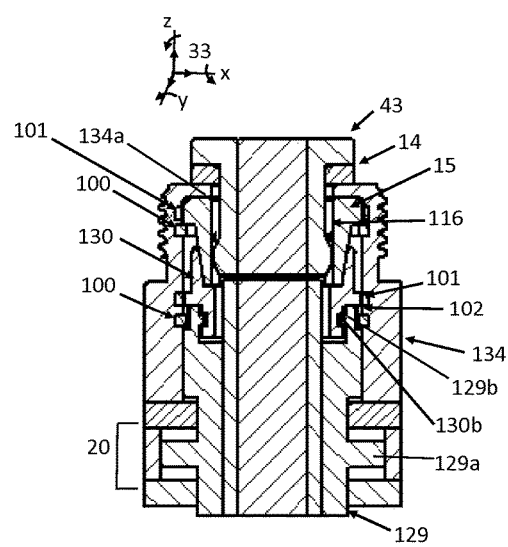
FIG. 30 shows a cross sectional view of a floating adhesive fixture device that enables the fixture element to translate and rotate with respect to the x, y, and z axes and prevents this motion with a clamping system that integrates a reverse collet, a sliding race, a floating clamp, and a hydraulically actuated thrust clamp.
Figure 31:
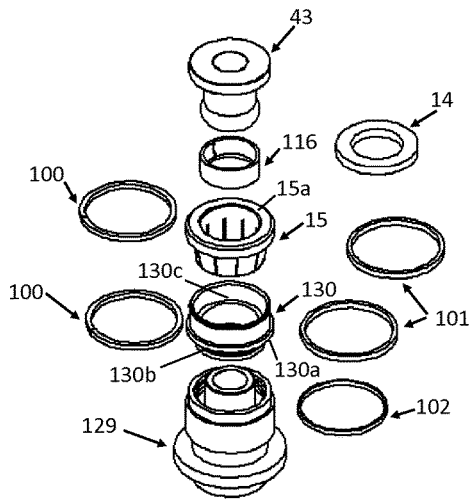
FIG. 31 shows an exploded perspective view of the fixture element and internal components illustrated in FIG. 30.

FIGS. 30 and 31 show a six d.d.o.f. device that allows the fixture element 43 to translate and rotate in directions parallel to the x, y, and z axes relative to outer body 134. The fixture element 43, flexure pad 14, collet 15, and sliding race 116 are identical to those described in the previous embodiment. A critical difference is that the top surface 15a of the reverse collet 15 is no longer fixed to the top planar surface 134a of the internal cavity of the outer body 134. Instead, the collet 15 is suspended in close proximity of top surface 134a by an elastomeric foam, flexure ring 101, which it is adhered to. The outer periphery of this ring is retained by a groove in the internal cavity of the outer body 134.

The addition of the flexure ring 101 allows the assembly comprised of the fixture element 43, sliding race 116, and collet 15 to translate in the x and y directions relative to the outer body 134. This, in combination with the mating relationships between surfaces 16a and 43c and surfaces 16b and 15b, provides the fixture element with six d.d.o.f. relative to the outer body 134 when the clamping mechanism is disengaged. Furthermore flexure pad 14 and flexure ring 100 keep the fixture element 43 and collet 15 at nominal positions and support their respective weights.

The clamping system consists of the collet 15, the floating clamp 130, and the hydraulically, actuated thrust clamp 129. The floating clamp 130 is suspended in the outer body 134 by two elastomeric foam rings. The larger ring 101 snaps into a groove in the inner cavity of the outer body. It surrounds the cylindrical surface 130a of the floating clamp 130. The smaller ring 102 sits directly below the major flange. It is supported by a retention snap ring 100. The floating clamp 130 has a tapered surface 130c that mates with the tapered tangs 15c of the collet.

The thrust clamp 129 has a tang 129b that mates with a groove 130b in the floating clamp 130. The thrust clamp 129 also has a piston feature 129a that enables it be displaced by hydraulic fluid within the hydraulic cylinder 20. When the thrust clamp 129 is forced upward, the tang 129b pushes the floating clamp 130 against the collet tangs. In turn this pushes surface 15a into frictional contact with surface 134a.

This locks out the x & y direction translation capability of the collet and fixture element. As the fluid pressure increases, the collet tangs deform further until they lock out the other four d.d.o.f. of the fixture element.

To disengage the clamping system, the fluid pressure is reversed, and the floating clamp 130 is pushed downward. The two retention snap rings 100 block the motion of the collet 15 and the floating clamp 130. This allows the floating clamp to break contact with the collet, and prevent the floating clamp from pulling back too far and damaging the flexure rings.

The embodiments that were described show the following:

Devices can offer anywhere from one to six d.d.o.f.
It is possible to lock out this motion with a single actuator
Mechanical clamps can be actuated manually, hydraulically, pneumatically, and electromagnetically
Mechanical elements can serve both guide and clamping function
Connectivity for actuation can be positioned at different locations relative to the fixing surface As will be clear to those of skill in the art, other floating adhesive fixture devices of similar function can be created. Important considerations are:

Number and types of d.d.o.f. the system provides to the fixing surface
Suspension compliance
Displacement range
The equilibrium position of the fixing surface while it is in the un-locked state
The stiffness of the fixing surface in the locked state
The position perturbing forces exerted on the fixing surface during clamping
The number and type of clamp actuators
Packaging and placement in relation to the work-piece and fixture base All of these considerations are inter-related and must be considered simultaneously. Nevertheless they will be discussed on an individual basis.

The number and type of d.d.o.f. that are needed are dependent on the application. When bonding a flat work-piece surface with a flat fixing surface, it may be easy to orient the fixing surface to be nominally parallel to the work-piece surface. In this scenario, most of the work-piece surface distortion will be normal to this interface. Consequently a one d.d.o.f. device allowing z axis translation may be all that is required. The same will be true if the geometry of the adhesive joint is axi-symmetric with regard to the z axis. Alternatively if the fixing surface and work-piece surface are not approximately parallel to one another or if the adhesive joint is very asymmetric, additional rotation d.d.o.f. and translational d.d.o.f. may be necessary to avoid exerting a torque and lateral forces on the work-piece surface.

The merits of a suspension system were previously described. It is possible in some applications to not use a suspension, but it makes the use of the device much more difficult. In particular it requires external positioning of the fixture elements and their subsequent clamping prior to the adhesion process. It also makes it difficult for a fixing surface to contact the work-piece without perturbing it and/or to float during adhesive solidification.

If a suspension is used, the needed compliance is dependent on the localized compliance of the work-piece surface. A design rule is that the suspension compliance must be no less than ten times greater than the compliance of the work-piece surface in order to recapture ninety percent of the elastic deformation induced by adhering stresses or changes in the internal stresses within the work-piece. To recapture ninety-nine percent, the compliance of the suspension must be no less than one hundred times greater. If sliding friction at the guide ways is factored in, then the suspension compliance must be even greater.

With regard to suspension design, there is flexibility. A single suspension may be used to support the fixture element or many separate suspensions may be used. A suspension may comprise a single solid part made from a material with a low elastic modulus and large loss modulus. Alternatively it may be made of a material with a high elastic modulus, but with a geometric design that makes it very compliant. A helical spring, leaf spring, and reed spring are examples. A suspension may be an assembly of these. It may also consist of a fluid filled bladder that is highly compliant. The bladder may be thin-walled and made from a material with a very low elastic modulus such as rubber. The fluid could be a gas or liquid.

In addition to providing high compliance, the suspension may also be designed to provide large viscous dampening. This would allow the floating fixture element to come to equilibrium quicker. The use of fluid filled dampers could serve this purpose.

With regard to contact, it is possible for a fixture element to be permanently joined to the suspension. Alternatively it is possible for the interface to be fixed by pre-loaded frictional contact. It is even possible for there to be frictional interfacial slip at these interfaces as long as the system of suspensions retains the fixture element and resists motion.

It is possible to have a suspension in which there is no solid material contact. For example, the fixture element could comprise a ferromagnetic material, and the outer body could contain electro-magnets. In this case, the fixture element could be supported by magnetic levitation. Another advantage of this method is that the compliance of the suspension can be controlled by the level of current. Consequently the system could serve as both a suspension and a clamp.

Alternatively the fixture element maybe suspended by aero-levitation. The fixture element may have surfaces in the shape of an airfoil. Fluid may flow though the base and through the outer body. As the fluid dynamically flows around the airfoils, the weight of the fixture element may be supported and it may be maintained at its nominal pose within the outer body. Displacement range is another factor. In general it should be sufficient to accommodate the distortion in the work-piece due to the adhesion process or dramatic changes in internal residual stresses within the work-piece. The compliance of the clamped fixing surface is another factor. It must be no more than one hundredth of the compliance of the work-piece surface in order to eliminate ninety-nine percent of the work-piece surface deformation due to external loading. This implies that consideration of external loading during manufacturing should be factored in when designing or selecting a floating adhesive fixture device.

Adhesive fixture devices are used at all possible orientations in practice. Consequently to be practical, the fixing surface must not displace close to the limits of its range under its own weight when unclamped. This suggests that the weight of the fixing element must be taken into consideration. In general reducing the weight of the fixture element reduces this concern.

The clamping mechanism exerts contact stresses on the fixture element to not only prevent its rigid body motion, but to also create a locked mechanical structure that will meet maximum limit compliance requirements. However the contact stresses need to be distributed in such a way that they nearly cancel each other out and perturb the position of the fixing surface to within a specified tolerance level. Similar to suspensions, there is a great deal of design flexibility available.

In the examples provided, all the clamping is energized through the actuation of a single clamp, mostly through the backside of the gripper. However the use of this technique may make it more difficult to satisfy specifications in general. This is especially true if the device offers an increasingly larger number of d.d.o.f. The use of multiple clamp actuators, energized simultaneously or in sequence may provide more design freedom to satisfy perturbation specifications. Spatially arranging them in different ways relative to the fixing surface may help as well. Of course all of this must be balanced against the fact that fewer clamp actuators will improve the design from the standpoint of cycle time, convenience, and device packaging.

The final consideration is where the floating adhesive fixture mechanism has to operate in spatial relationship to the work-piece and the fixture base as well as its mobility before the adhering process. The examples provided demonstrated a self-contained device that can be surrounded by a fixture base and yet still provide access for clamp actuation. The outer body also has the ability to move relative to the fixture base via a screwing motion to provide extra clearance during work-piece loading.

However the general concept does not have to be implemented in this way. The outer body of a self-contained device may take on any form that makes it attractive to the application with regard to work-piece clearance and access for a given application. The mobility of the self-contained device can take on any form as well. The only expectation is that the outer body is anchored to the fixture base immediately prior to the adhering process. Furthermore it is not necessary to create a self-contained device to implement the floating adhesive fixture device concept. It is reasonable that system components can be individually assembled into a fixture base and still work together to enable a fixing surface to float.

Figure 32:
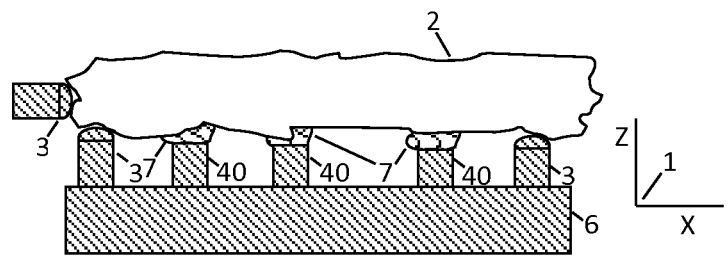
FIG. 32 shows a work-piece held in an adhesive fixture with floating adhesive grippers prior to the solidification of the structural adhesive, with the grippers unclamped and with the work-piece is in its free state shape.

FIGS. 32-35 illustrate how floating adhesive fixture devices, configured as floating grippers, can be used to reduce work-piece distortion. FIG. 32 illustrates a work-piece restrained with a system of supports 3 and floating grippers 40. In this particular example, the supports are permanent members of the fixture base. The floating grippers are similar to those illustrated in FIG. 28. Each floating gripper can rotate about a spherical joint that translates in the Z direction.

Figure 33:
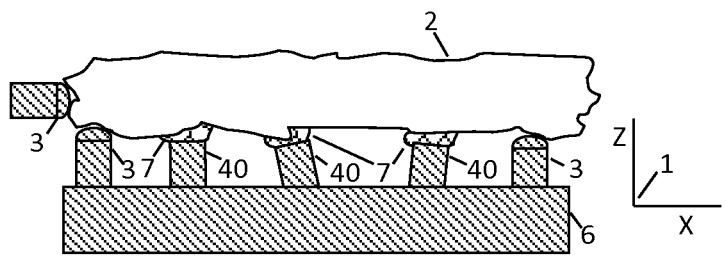
FIG. 33 shows the system described in FIG. 32 after adhesive solidification in which the floating adhesive grippers have displaced to relieve adhesive stresses and allow the work-piece to retain its free state shape.

The structural adhesive has been interspaced between the work-piece and floating grippers, but has yet to be solidified. The floating grippers are unclamped, yet kept at a nominal position by their suspension. FIG. 33 illustrates the system as the adhesive solidifies and shrinks. The adhesive instantaneously adheres to the work-piece surfaces and the fixing surfaces. It exerts tensile normal stresses and compressive hoop stresses and compressive radial stresses on both.

The normal stresses exerted on the floating gripper drag it through space until solidification is complete. Because the motion resistance of each floating gripper is negligible, the normal stresses within the corresponding adhesive joint cannot grow. In turn this means the normal stresses on the work-piece surfaces are also small. If the adhesive solidification process transfers heat into the adhesive joint and causes thermal growth of the work-piece, adhesive, and floating gripper this does not present a problem. As long as the floating gripper remains unclamped, it is free to displace as the temperature of the system reaches a steady state value and thermal growth/contraction ceases.

Once the system has reached equilibrium, the floating gripper is clamped. The stresses within the adhesive joint are low but not zero however. As long as the adhesive adheres the work-piece surface, it exerts hoop and radial stresses. However in most applications, the work-piece is very stiff in these directions, even if it is very thin. Consequently the work-piece distortion due to these stresses is very small.

Figure 5:
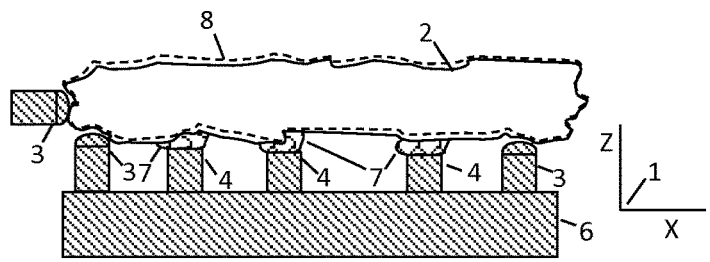
FIG. 5 shows a work-piece distorted from its free state shape by residual adhesive stresses from the adhesion process.
Figure 6:
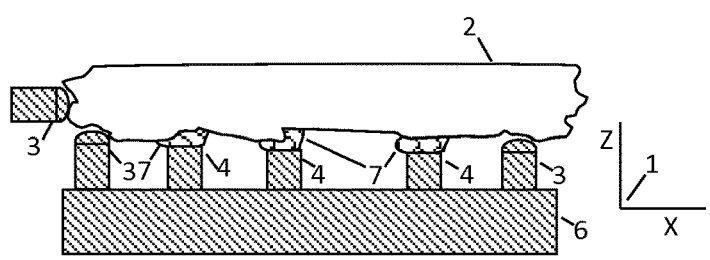
FIG. 6 shows the system described in FIG. 5 immediately after machining in which the machined surface is free of form error and all other surfaces are distorted from the previous adhesion process.
Figure 7:
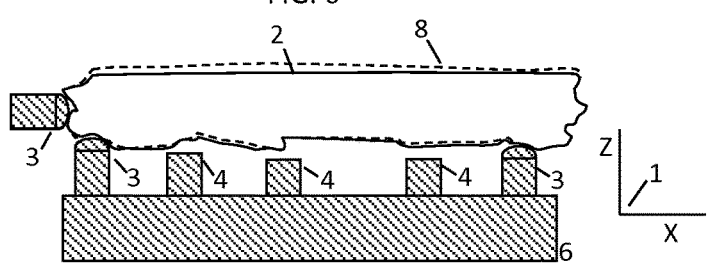
FIG. 7 shows the system described in FIG. 6 in which the work-piece obtains its free state shape after the removal of the adhesive joints, causing the previously machined surface to become distorted.
Figure 8:
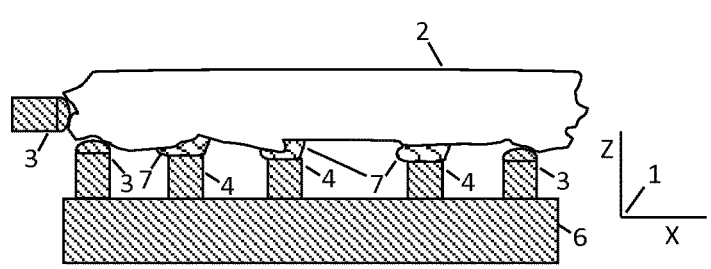
FIG. 8 shows a work-piece that was adhered to the fixture without residual adhesive stress and which has been subsequently machined creating an imbalance of internal residual stresses and residual stresses within the adhesive joints.
Figure 9:
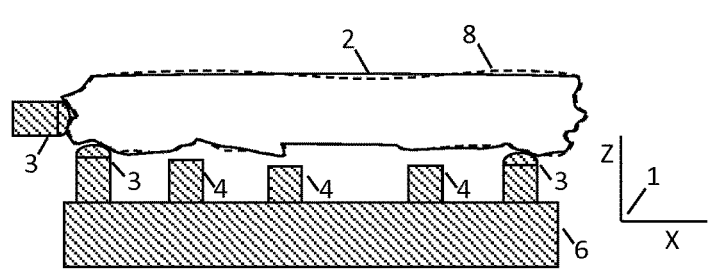
FIG. 9 shows the system described in FIG. 8 in which the work-piece obtains its free state shape after the removal of the adhesive joints, causing the previously machined surface to become distorted due to the imbalance of internal residual stresses.

With this in mind, many applications that would ordinarily be troubled by adhesive solidification will no longer be. However the usefulness of this concept does not stop here. Assume in the previous example that the floating grippers are clamped before solidification. After the system has thermally stabilized, it resembles the distorted system illustrated in FIG. 5. However if the floating grippers are unclamped, they displace to relieve the stresses in the adhesive joints, and the work-piece is allowed to relax to its free state shape. Afterwards they are clamped once again.

The same concept can be applied with systems that utilize pressure sensitive adhesives. In this case, the grippers are locked at the beginning of the adhesion process. The pressure sensitive adhesive is dispersed on to the grippers, and the work-piece is pressed on to the adhesive, leaving residual stresses. Releasing the grippers allows the work-piece to flex back and obtain it free state shape. Afterwards the grippers are locked and the part is sent off for processing.

Figure 34:
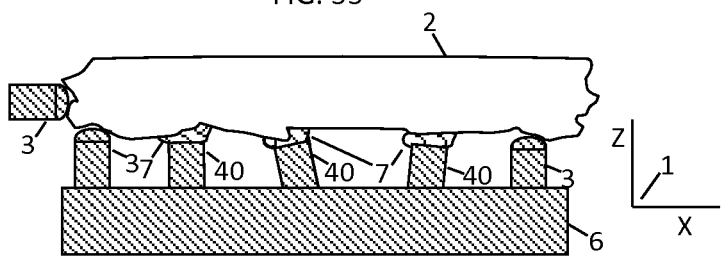
FIG. 34 shows the system described in FIG. 33 after the machining process.
Figure 35:
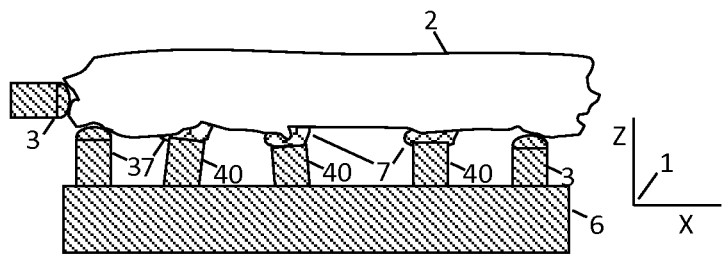
FIG. 35 shows the system described in FIG. 34 after the floating adhesive grippers are unclamped and the work-piece is allowed to obtain its free state shape while still adhered.

To further see the usefulness of this invention, consider FIG. 34. Here the work-piece, in its free-state shape, is machined. This yields a machined surface free of geometric error, but a work-piece with an imbalance of internal stresses. This imbalance is countered by stresses that arise within the adhesive joints. To reveal the geometric error of the machined surface, the floating grippers are unclamped to allow the adhesive joints and work-piece to naturally stress relieve. This allows all surfaces of the work-piece to relax to their new free state shape as shown in FIG. 35.

Afterwards, the grippers are locked again, and the adhered work-piece is sent to an inspection process in order to characterize the geometric error of the machined surface. If need be, the work-piece is sent back to the machining process for further refinement. In this second iteration, the machining process need only remove a very small amount of material to tweak the surface in. Of course modern machine tools often have in-process inspection capability. In this case, the fixture may not have to be removed from the machining center.

Taking this one step further, if the evolution of change in the work-piece shape is repeatable, the in-process inspection process can be avoided all together. The machining process could be naturally paused at short intervals, during which the floating grippers are unclamped and clamped to allow the work-piece to relax to its free state shape.

Beyond what has been described here, there is another added benefit to stress relieving the adhesive joints using floating grippers. Because stresses within the adhesive joints have been relieved, the adhesive joints are better able to withstand external stresses supplied by the manufacturing process, especially ones that are dynamic. This will improve the holding reliability of the fixture.

The concept of a floating adhesive fixture device can also be extended to floating adhesive supports. Consider the two floating adhesive supports illustrated in FIG. 36. These devices utilize the same mechanism and same working principle as the floating gripper in the previous example. The difference is that they make direct material-to-material contact with the work-piece.

Two types of floating adhesive supports are illustrated. The first type 41 is shown making only point contact with the work-piece surface. Consequently it can allow relative motion between the work-piece surface and the support. The second type 42 does not. It has a pivoting head that allows it to make multiple point contact with the work-piece surface. The adhesive interface lies within the convex defined by these points. The pivoting head may or may not have the capability of being locked out to prevent rotation. The advantage of support 42 is that is provides greater contact stiffness than support 41.

Figure 36:
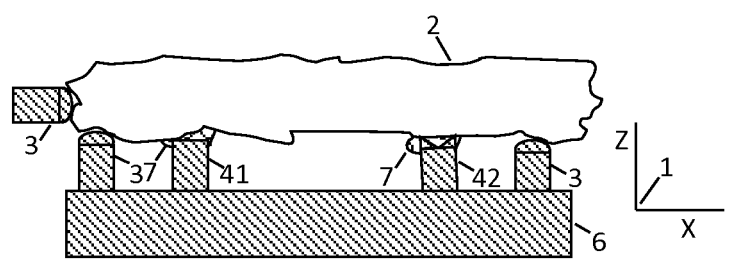
FIG. 36 shows a work-piece held in an adhesive fixture with floating adhesive supports prior to the adhesion process and with the work-piece is in its free state shape.
Figure 37:
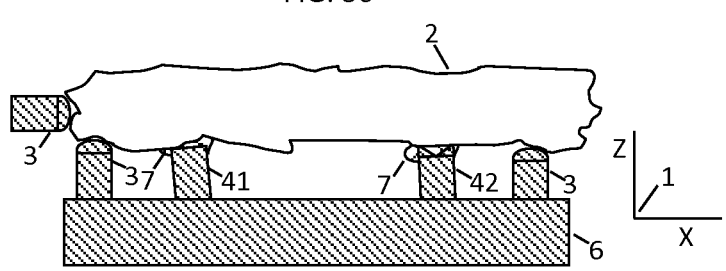
FIG. 37 shows the system described in FIG. 36 after the adhesion process in which the floating adhesive supports have displaced to relieve adhesion process stresses and allow the work-piece to retain its free state shape.

The structural adhesive shown in FIG. 36 is unsolidified. During adhesive solidification (see FIG. 37), the shrinking adhesive on the fixing surface of the floating adhesive support 41 causes it to rotate relative to the contact point. The adhesive on the fixing surface of floating adhesive support 42 shrinks and creates a tensile pre-load between the relevant surface and the pivot head. This can potentially cause the work-piece surface to distort. However if the distance between the contact points is small, the localized stiffness of the work-piece surface is high. Furthermore if the main body of the floating gripper is unclamped, it will not exert an additional load on the part.

Figure 38:
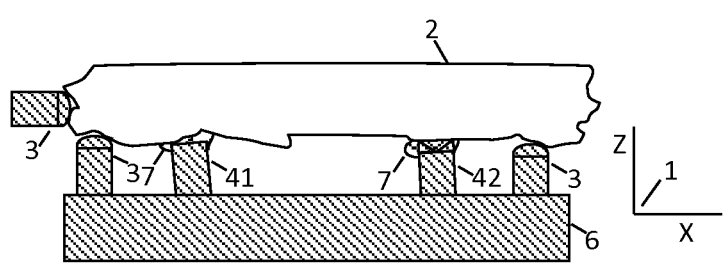
FIG. 38 shows the system described in FIG. 38 after a machining process.
Figure 39:
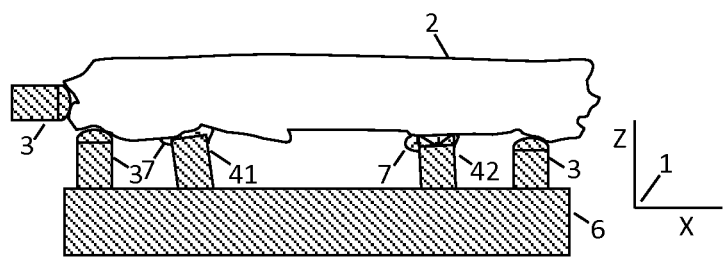
FIG. 39 shows the system described in FIG. 38 after the floating adhesive supports are unclamped and the work-piece is allowed to obtain its free state shape while still adhered.

Once the adhesion process is complete, the floating adhesive supports are clamped. If desired, the pivot head in support 42 can also be locked to provide additional holding stiffness. The part is then sent for processing (see FIG. 38). Afterward the floating adhesive supports are unclamped as illustrated in FIG. 39. Support 41 will displace to relieve stresses within both the adhesive and work-piece. Support 42 will displace to relieve stresses primarily in the work-piece.

Figure 40:
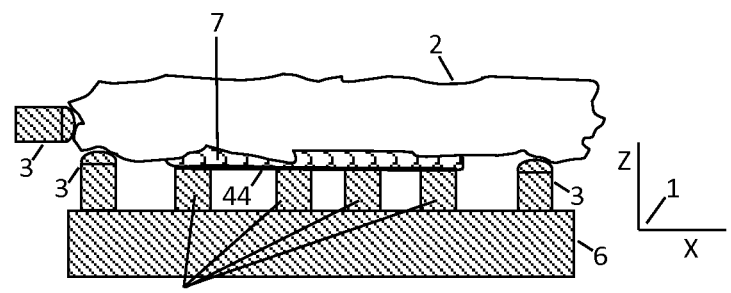
FIG. 40 shows a work-piece held in an adhesive fixture with a flexible, continuous web with a fixing surface that is in connection with floating adhesive device mechanisms prior to the adhesion process and with the work-piece in its free state shape.

Another embodiment of this invention is illustrated in FIG. 40. Here a large, flexible web 44 is attached to a system of floating devices 43 whose suspension, clamping, and guide mechanisms are similar to those described previously. In this scenario, the web defines or contains the fixing surface. This flexible web may be comprised of a thin sheet made of metal, plastic, or ceramic. Additionally it may be optically transparent. The thickness of this flexible web may typically range between 0.005 inches to 0.05 inches depending on compliance requirements. When the fixture elements are unclamped, they, along with the flexible web, are suspended. In this state, the fixture elements can displace with various d.o.f. The web can displace, and also change shape under its own weight.

Figure 41:
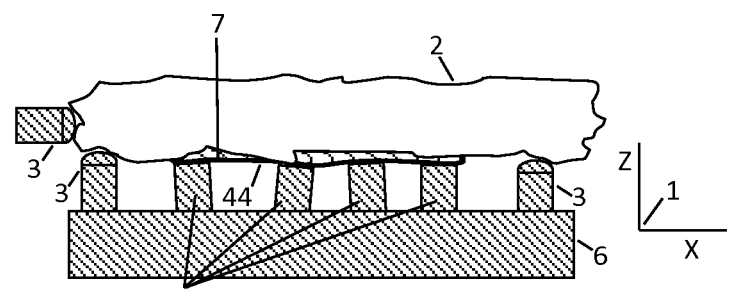
FIG. 41 shows the system described in FIG. 40 after the adhesion process in which the floating mechanisms have displaced and the flexible fixing surface has changed shape and position to relieve adhesion process stresses and allow the work-piece to retain its free state shape.

When in use, adhesive is distributed at various regions of the fixing surface or over its entirety as shown in FIG. 40, and the work-piece is adhered. Either during the adhesion process or immediately after, the floating devices are unlocked to allow the entire fixing surface to change shape and displace as shown in FIG. 41. This shape change and displacement will be actuated by the work-piece and adhesive changing shape in order to reduce stress. Once the work-piece and fixing surface have been given the opportunity to obtain their new equilibrium shapes, the floating devices are locked, which stiffens the entire fixing surface without perturbing its shape or position.

Figure 42:
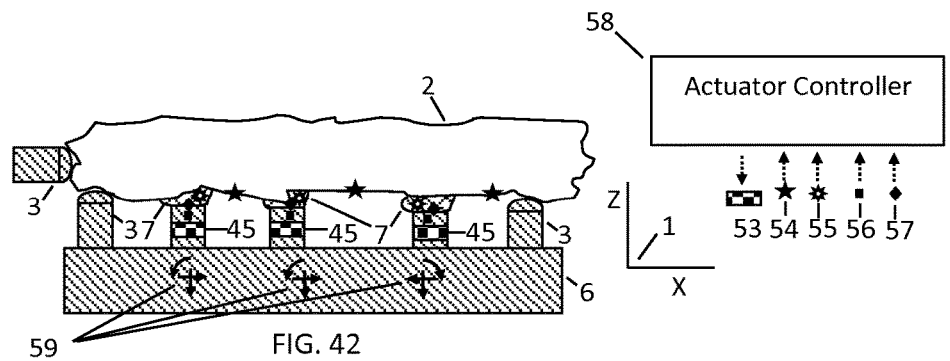
FIG. 42 shows a work-piece held in an adhesive fixture with floating adhesive grippers with embedded micro-actuators and with a plurality of regions in which strain and stress are measured, and prior to the adhesion process with the work-piece in its free state shape.

Another embodiment of this invention is illustrated in FIG. 42. Here is a fixture with floating adhesive fixture devices 45. Each device has an embedded actuator(s) 53 that can displace the fixing surface relative to the base when the clamping mechanisms are engaged. The displacement d.d.o.f 59 provided by the actuator mechanism may range from one to six. Also shown are measurement regions where measurements can be taken to assess stress or strain in the system. This includes strain measurements at a work-piece surface 54, strain measurements within the adhesive joint 55 or at an interface 56 between the adhesive and either the fixing surface or the work-piece surface, and stress or strain measurements on the floating fixture element in regions 57 that are in close proximity to the fixing surface. Also shown is a controller 8 that accepts data from locations 54-57 and in turn controls the external stresses and forces exerted by the actuator(s) on the fixing surface(s).

Figure 43:
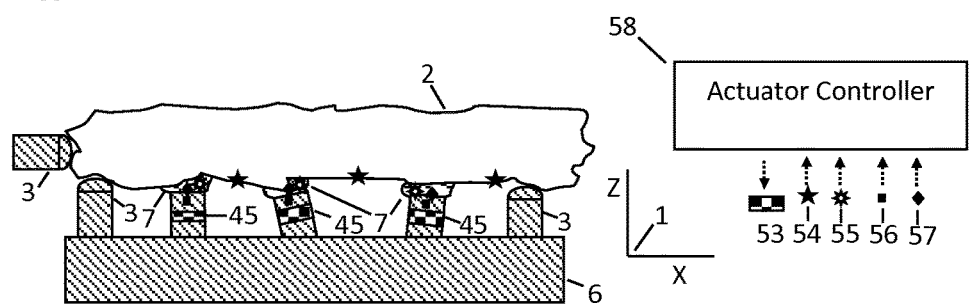
FIG. 43 shows the system described in FIG. 42 after the adhesion process in which the floating adhesive grippers have displaced to relieve adhesion process stresses and allow the work-piece to distort closer to its free state shape.
Figure 44:
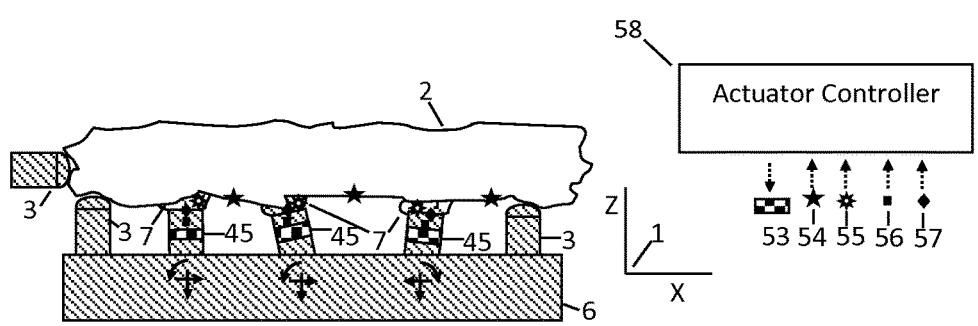
FIG. 44 shows the system described in FIG. 43 in which a controller is in communication with strain sensors, stress sensors, and the micro-actuators displace the fixing surfaces to further relieve stresses within the adhesive joints and work-piece thus allowing the work-piece to retain its free state shape.

In this scenario, the floating grippers are unclamped and clamped as illustrated in FIG. 43. This allows as much relaxation in the work-piece and adhesive joints as possible within the technical limitations of the suspension and clamping system. During this activity or immediately after, strain and stress data collected from the sensors are used to benchmark the degree of residual stress and strain in the system. Subsequently the actuators are used to micro-displace the fixing surfaces (see FIG. 44) to further reduce strain and stress in the work-piece and adhesive.

Strain measurements at locations 54, 55, 56, and 57 could be achieved through the use of an electrical strain gauge. If an optical window is provided to the adhesive joint, which is the preferred embodiment, it is possible to characterize adhesive joint strain through one of the many available optical methods used to measure strain. If a piezo-electric semi-conductor were embedded at the fixing surface or just below, it would be possible to measure stress in the fixing surface for a short time duration.

Additional types of measurements at these regions could also serve this ultimate purpose. For example, a self-contained force transducer could be integrated into a fixture element assembly near the fixing surface. Since force measurement is going to be highly correlated to the level of stress within the fixture element, it could be used in lieu of a stress or strain measurement.

Another example is temperature measurement. Temperature sensors such as thermocouples could be placed at any of the strategic locations. These sensors could be used to aid clamping or displacement actuation. With regard to clamping, it would be desired to postpone clamping of the floating fixture elements until the work-piece and fixture reached at state of thermal equilibrium, preferably at room temperature. With regard to micro-displacement actuation, it would be desired to compensate for thermal growth in the fixture elements or work-piece if any of the elements were not thermally stabilized.

Displacement actuation of the fixing surface could be achieved by any one of the multitude of micro-actuation technologies known in common practice. These commonly use solid state actuators that are made from materials that exhibit piezo-electric, magneto-restrictive, and shape memory properties, among others.

In practice it may be possible to use these types of actuators to directly displace a fixing surface without the use of a suspension and clamping system. However there is an impediment to doing so if reasonably large displacement ranges are needed. In general, all of the solid state actuator materials are only capable of very small strain when actuated. To be capable of directly displacing a fixing surface over a range of 0.2 mm, a linear, piezo-electric actuator will have to have a length of 310 mm. This is far too large to be packaged into a typical adhesive fixture. However if packaged with a floating fixture element that can absorb 90 percent of this motion range by floating, the actuator length is reduced to 31 mm. This is a manageable length to integrate into an adhesive fixture element. An extra bonus is the increase in system stiffness.

Figure 45:
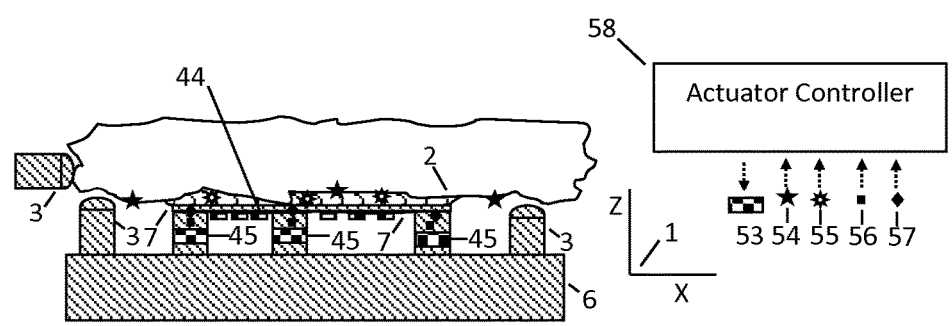
FIG. 45 shows a work-piece held in an adhesive fixture with a continuous, flexible web connected to floating adhesive mechanisms; both with embedded micro-actuators and with a plurality of regions in which strain and stress are measured.

Note that this same concept can be extended to the distortable fixing surface concept as illustrated in FIG. 45. In this case, strain and stress measurements will include those across the entire web surface. Likewise a variety of micro-actuators can be placed on the non-fixing side of the web to actively distort it in conjunction with or in substitution of actuation in the floating elements. It is even possible to imbed actuators and strain sensors in the interior of this surface to both generate strain and measure it.

It should also be noted that a system such as the one just described has additional utility. For example, it could be possible to use the controller, micro-actuators, and a plurality of stress, strain, force, displacement, and temperature measurements to change the shape of the fixing surfaces while the work-piece is being actively perturbed by the manufacturing process for the purpose of achieving a work-piece shape that is closer to the free state shape once the manufacturing process ceases to perturb it.

Figure 46:
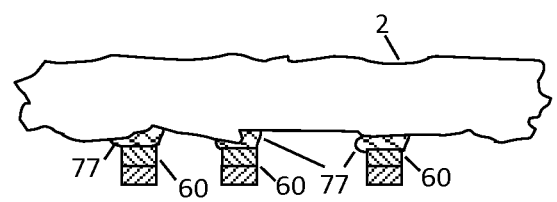
FIG. 46 shows a work-piece with adhered fastening elements which have floating adhesive fixture devices.
Figure 47:
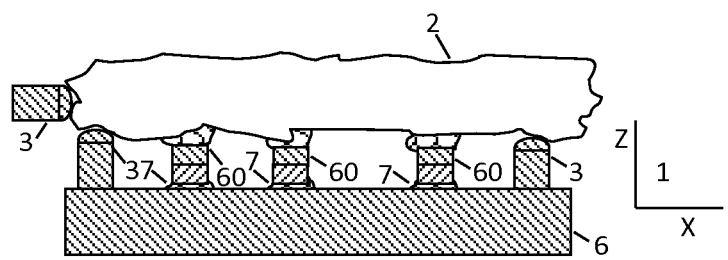
FIG. 47 shows the work-piece with adhered fastening elements mounted in a fixture with adhesive interspersed between the fastening elements and the fixture base.
Figure 48:
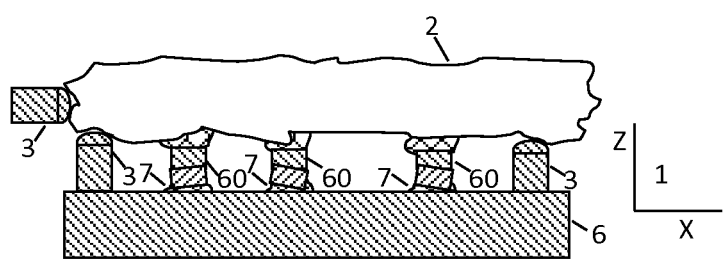
FIG. 48 shows the displacement of the fixture element surfaces during the adhesion process to allow the work-piece to retain its free state shape.

A final embodiment of this invention is disclosed in FIGS. 46-48. Specifically fastening elements 60 with lockable, floating fixing surfaces are used in lieu of or in conjunction with floating adhesive fixture devices. FIG. 46 shows the bonding of the fasteners 60 to the work-piece 2 before it is bonded to the fixture. FIG. 47 shows the work-piece with bonded fasteners mounted in the fixture. Adhesive is interspersed between the fixture base 6 and the fixing surfaces of the fasteners. FIG. 48 shows the system after each floating fastener is unlocked to allow each fixing surface to displace with minor resistance. Similar to the cases described, this will allow the work-piece and adhesive joints to stress relieve. Afterward the floating fasteners can be clamped to provide greater rigidity.

It should also be noted that the floating fasteners do not necessarily need to be adhered to the work-piece. Any suitable means of fastening is acceptable as long it meets the needs of manufacturing process.

Definitions

For purposes of disclosure, the following definitions are used in this patent application.

Displacement Degrees of Freedom (D.D.O.F.) All particles within a solid body or assembly are capable of motion such that the displacement of any individual particle is mathematically describable as the sum of a 3 dimensional, rigid body, displacement vector common to all particles and a deformation displacement vector unique to that point which is not necessarily equivalent to the deformation displacement vector of any other point. Rigid body displacement in 3D space may comprise one, two, or three degrees of freedom of translation motion coupled with one, two, or three degrees of freedom of rotational motion.

Mechanical Lockout: Through physical interaction, all d.d.o.f. of a solid body are prevented.

Mechanical Flexure: A part or mechanical assembly whose primary function is to provide a compliant connection between two or more mechanical parts. Examples are helical springs and leaf springs.

Solid Work-piece: A single solid work-piece comprised of one or more materials, capable of six d.d.o.f. of when unrestrained. When six d.d.o.f. are mechanically locked, the part can only experience shape distortion in response to external forces.

Assembled Work-piece: A work-piece comprised of multiple parts, which are mechanically restrained relative to one another. This definition includes an assembly consisting of one or more valued products attached to parts that serve as processing aids, and are later removed once processing is complete. An example of a processing aid is one that provides a fixing surface to adhere to within an adhesive fixture.

Locked-Out Assembled Work-piece: An assembled work-piece with all of its fixing surfaces mechanically locked out to prohibit any relative d.d.o.f. The set of can only move as if belonging to a single part.

Semi-Locked-Out Assembled Work-piece: Similar to a locked-out assembled work-piece, with the exception that one or more fixing surfaces may have one or more relative d.d.o.f.

Adhesive Fixture: A device that uses adhesive in total or in-part to restrain the d.d.o.f. and deformation of a work-piece subject to a manufacturing process including fabrication, assembly, and inspection. Adhesive fixtures include devices that partially or totally encapsulate subsets of work-piece geometric features.

Adhesive: Any substance that can be interspersed between two solid substrates for the purpose of adhering them and locking out their relative d.d.o.f. It includes compounds comprised of a plurality of organic, metallic, and ceramic materials.

Structural Adhesive: An adhesive that is interspersed between two solid substrates while in a flowable, viscous state or liquid state, and is later solidified through some means including polymerization and liquid-to-solid solidification via cooling.

Pressure Sensitive Adhesive: A deformable adhesive that is pre-activated into a tacky state and is interspersed between two substrates by moving the substrate surfaces together and plastically deforming the adhesive such that is enters the interstices of the substrate surfaces, thus increasing the real area of interface contact between the adhesive and substrates.

Fixture Support: A solid part, locked assembly, or semi-locked assembly that makes direct material to material contact with a work-piece surface for the purposes of its registration, mechanical restraint, or both.

Adhesive Support: A fixture support that has a surface that receives adhesive for the purpose of providing additional mechanical restraint to the work-piece. This includes the small surface interstices lying within a surface patch that makes intermittent direct material contact with the work-piece.

Adhesive Gripper: A solid part or rigid assembly that does not make direct material to material contact with a work-piece surface, but instead uses an interceding adhesive to provide mechanical restraint.

Fixing Surface: A surface patch on an adhesive gripper or adhesive support that has an adhesive interface for restraining the work-piece.

Adhesive Fixture Base: The composition of all parts and assemblies within an adhesive fixture whose relative d.d.o.f. are mechanically locked prior to the time the work-piece surfaces first come into contact with the adhesive until a time that the adhesive joints are ruptured for work-piece removal. One or more parts of the base provide the interface between the adhesive fixture and a manufacturing process machine. The base may be permanently mounted to the manufacturing process machine or it may be disconnected to allow the adhesive fixture to be transported and mounted to other manufacturing process machines. Moving the base serves to move the adhered work-piece.

Free State Shape: A work-piece shape, at a uniform temperature of 20° C., that is at a specified orientation and in static equilibrium in a gravitational field while resting on a system of fixture supports of specified geometry arranged at specified positions. There is no adhesive between the work-piece and fixture supports. The work-piece is only subject to body forces due to gravity and reactive contact stresses at the supports.

Adhesion Process: The process of adhering a work-piece relevant surface to the fixing surface of an adhesive gripper or adhesive fixture support. The adhesion process differs between a structural adhesive and a pressure sensitive adhesive. In the case of a structural adhesive, it is assumed that prior to the adhesion process, the adhesive, in a fluid/gel like state, has been interspaced between the relevant surface and the fixing surface by some means and that the two surfaces are in a position ready to by joined. The adhesion process begins the moment that the adhesive starts to solidify and can provide elastic deformation resistance between the relevant surface and the fixing surface. In the case of a pressure sensitive adhesive, the adhesion process initiates once both surfaces make contact.

As will be clear to those of skill in the art, the herein described embodiments of the present invention may be altered in various ways without departing from the scope or teaching of the present invention. It is the following claims, including all equivalents, which define the scope of the invention.

We claim:

1. A method of holding a work-piece on an adhesive fixture, comprising:

providing a fixture having a fixture base and a plurality of fixing surfaces each capable of displacing relative to the fixture base, the fixture including a plurality of fixture elements each defining one of the fixing surfaces, each of the fixture elements being capable of displacing relative to the fixture base with prescribed degrees of freedom, the fixture further including a clamping system operable to selectively disengage so as to release displacement of each of the fixture elements relative to the fixture base or engage so as to stop displacement of each of the fixture elements relative to the fixture base, the fixture further having a suspension for each fixture element operable to support each fixture element in a nominal pose, wherein when the clamping system is disengaged, gravitational forces acting on the fixture elements are countered by the suspensions;

adjoining adhesive to at least one of the fixing surfaces of the fixture elements;

adhering the adhesive to the at least one fixing surface and to a work-piece to create an adhesive joint between the at least one fixing surface and the work-piece to restrain the work-piece during a manufacturing process; and disengaging the clamping system such that the fixture elements are displaceable;

allowing each of the fixture elements to displace as the work-piece and adhesive joint obtain an equilibrium shape to reduce strain energy, wherein displacement of the fixing surfaces reducing stresses within the adhesive joint; and engaging the clamping system to stop the motion freedom of the fixture elements after the work-piece and adhesive joint have obtained their equilibrium shape;

whereby the work-piece is allowed to obtain an equilibrium shape closer to a free state without rupturing the adhesive joint or substantially reducing its holding strength.

2. The method according to claim 1, wherein each suspension comprises a suspension selected from a group consisting of:
   a solid part that intercedes in a connection between the fixture element and base, said solid part made from at least one of a polymer and material with a porous internal structure;
   a mechanical flexure that intercedes in the connection between the fixture element and base;
   a fluid filled bladder that intercedes in a connection between the fixture element and base, said fluid selected from a group consisting of a gas or liquid;
   a magnetic levitation system having an electro-magnetic system attached to the base and magnets or ferro-magnetic material integral with the fixture element such that the fixture element is supported by magnetic forces that result from an electrical current running through the electro-magnetic system; and
   an aero-levitation system wherein the fixture element has airfoil features and the fixture element is supported by pressure exerted on the airfoils by a fluid flowing past the fixture element, said fluid transported through the base.

3. The method according to claim 1, wherein:
   the fixture base defines a planar surface;
   each fixture element is held in close proximity to the planar surface of the base by the suspension; and
   each fixture element is configured to displace by a displacement selected from the group consisting of a translation parallel to the planar surface of the base, a rotation about an axis parallel to the normal of the planar surface of the base, and a rotation about a line parallel to the planar surface of the base.

4. The method according to claim 1, wherein:
   the fixture base defines a geometric feature with a central axis;
   each fixture element is held in close proximity to the geometric feature by the suspension; and
   each fixture element is configured to displace by a displacement selected from the group consisting of a translation parallel to the central axis, a rotation about a line parallel to the central axis, and a rotation about a line perpendicular to the central axis.

5. The method according to claim 1, wherein the fixing surfaces do not make direct contact with the work-piece.

6. The method according to claim 1, wherein:
   the clamping system comprises a thin walled sleeve that either surrounds each fixture element or is surrounded by each fixture element, the step of engaging the clamping system comprising deforming the thin walled sleeve laterally into frictional contact with the fixture element to stop displacement of the fixture element;
   the deforming of the thin wall sleeve being actuated by an actuation selected from the group consisting of:
      fluid pressure;
      electro-magnetic force;
      axial compression applied to the thin walled sleeve;
      axial tension applied to the thin walled sleeve; and
      axial torsion applied to the thin walled sleeve.

7. The method according to claim 1, wherein:
   the clamping system comprises a reverse collet with a split, tapered tangs that surround each fixture element and a clamp with a tapered surface that mates with the collet tangs;
   the step of engaging the clamping system to stop displacement of the fixture element comprising displacing the clamp relative to the collet, forcing the tangs to deform and creating frictional contact with the fixture element; and
   the step of disengaging the clamping system and releasing displacement of the fixture element comprising displacing the clamp is in an opposite direction.

8. The method according to claim 3, wherein:
   the clamping system comprises a clamping piston;
   the step of engaging the clamping system comprising displacing the piston orthogonal to B the planar surface into frictional contact with the fixture elements; and
   the step of disengaging the clamping system comprising displacing the piston in an opposite direction.

9. The method according to claim 4, wherein:
   the clamping system comprises a clamping piston;
   the step of engaging the clamping system comprising displacing the piston orthogonal to the central axis into frictional contact with the fixture elements; and
   the step of disengaging the clamping system comprising displacing the piston in an opposite direction.

10. The method according to claim 1, wherein:
    the adhesive is a structural adhesive; and
    the step of adhering of the adhesive further comprises:
       positioning each fixture element and its suspension relative to the fixture base in order to obtain an optimal pose between the respective fixing surface and work-piece;
       disengaging the clamping system;
       adjoining the adhesive, in a viscous state, to the at least one fixing surface and work-piece;
       allowing the adhered fixture element to displace with its respective displacement freedom as the adhesive transitions from the viscous state to a solid state; and
       engaging the clamping system to stop the displacement freedom of the fixture element.

11. The method according to claim 1, wherein:
    the fixture further comprises a continuous flexible element defining a continuous flexible fixing surface, the continuous flexible element being adjoined to the fixing surfaces of a plurality of the fixture elements;
    wherein the step of disengaging the clamping system allows the continuous fixing surface to change shape and position for the purpose of reducing the stresses within the adhesive joint and allowing the work-piece to obtain a new equilibrium shape.

12. The method according to claim 1, wherein:
    the fixture further comprises:
    actuators operable to actively change the shape of the fixing surfaces and/or displace the fixing surfaces;
    a network of sensors operable to measure at least one of strain, stress, force, and temperature from at least one of the adhesive joints and fixing surfaces; and
    a controller in communication with the actuators and sensors, wherein the altering of the fixing surfaces is controlled by the controller communicating with the actuators and sensors to minimize the stresses in the adhesive joints.

13. The method according to claim 1, wherein the adhesive is a radiation curable adhesive and the step of adhering the adhesive to the at least one fixing surface and work-piece involves the transmission of curing radiation into the adhesive.

14. The method according to claim 1, wherein the at least one fixing surface comprises a core transparent to curing radiation and the step of adhering the adhesive further comprises transmission of a curing radiation through the core and into the adhesive.

\* \* \* \* \*